United States Patent
Park et al.

(10) Patent No.: US 12,517,608 B2
(45) Date of Patent: Jan. 6, 2026

(54) TRANSPARENT DISPLAY DEVICE WITH TOUCH SENSOR

(71) Applicant: LG Display Co., Ltd., Seoul (KR)

(72) Inventors: JaeHee Park, Paju-si (KR); MiReum Lee, Paju-si (KR); Jonghyeok Im, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/977,930

(22) Filed: Oct. 31, 2022

(65) Prior Publication Data

US 2023/0195253 A1   Jun. 22, 2023

(30) Foreign Application Priority Data

Dec. 21, 2021   (KR) .......................... 10-2021-0183658

(51) Int. Cl.
  *G06F 3/041*   (2006.01)
  *G06F 3/044*   (2006.01)
  *H10K 59/40*   (2023.01)

(52) U.S. Cl.
  CPC ........ *G06F 3/04164* (2019.05); *G06F 3/0412* (2013.01); *G06F 3/0446* (2019.05); *H10K 59/40* (2023.02)

(58) Field of Classification Search
  None
  See application file for complete search history.

(56) References Cited

U.S. PATENT DOCUMENTS

| | | | |
|---|---|---|---|
| 2020/0273926 A1* | 8/2020 | Lee | H10K 59/80521 |
| 2021/0157188 A1* | 5/2021 | Liu | G06F 3/0412 |
| 2021/0202680 A1* | 7/2021 | Shin | H10K 59/121 |
| 2021/0320163 A1* | 10/2021 | Bang | H10K 59/131 |

FOREIGN PATENT DOCUMENTS

| | | |
|---|---|---|
| KR | 101679977 B1 | 11/2016 |
| KR | 20170089460 A | 8/2017 |
| KR | 20180131802 A | 12/2018 |
| KR | 20210062178 A | 5/2021 |
| KR | 20210085828 A | 7/2021 |
| KR | 20210117378 A | 9/2021 |

* cited by examiner

*Primary Examiner* — Brian M Butcher
(74) *Attorney, Agent, or Firm* — Seed Intellectual Property Law Group LLP

(57) ABSTRACT

A transparent display device with a touch sensor is provided, which may minimize loss of light transmittance due to a touch sensor and a touch line, and may improve uniformity of parasitic capacitance between touch lines. The transparent display device with a touch sensor comprises a substrate provided with a transmissive area and a non-transmissive area, a touch sensor provided in the transmissive area over the substrate, including a touch sensor electrode, a pixel provided in the non-transmissive area over the substrate, including a plurality of light emitting elements comprised of an anode electrode, a light emitting layer and a cathode electrode, a first signal line extended from the non-transmissive area in a first direction, a first touch line provided between the first signal line and the transmissive area, and a second touch line provided between the first touch line and the transmissive area. The first touch line is disposed to have a first spaced distance from the first signal line, the second touch line is disposed to have a second spaced distance from the first touch line, and the first spaced distance may be greater than the second spaced distance.

14 Claims, 14 Drawing Sheets

(a) Touch Signal    (b) Touch Signal_Cp (a) Touch Signal_Cp1    (b) Touch Signal on Touch (c) Touch Signal_Cp2

TRANSPARENT DISPLAY DEVICE WITH TOUCH SENSOR

BACKGROUND

Technical Field

The present disclosure relates to a transparent display device with a touch sensor.

Description of the Related Art

Recently, studies for a transparent display device in which a user may view objects or images positioned at an opposite side through the display device are actively ongoing. The transparent display device includes a display area on which an image is displayed, wherein the display area may include a transmissive area capable of transmitting external light and a non-transmissive area, and may have high light transmittance through the transmissive area.

A transparent display device may be provided with a plurality of touch sensors and a plurality of touch lines to implement a touch function.

BRIEF SUMMARY

The inventors have realized that the transparent display device has problems in that light transmittance may be reduced due to the plurality of touch sensors and the plurality of touch lines and parasitic capacitance is increased due to a short-spaced distance between signal lines and touch lines.

The present disclosure has been made in view of the above problems and it is a technical benefit of the present disclosure to provide a transparent display device that may reduce or minimize loss of light transmittance due to a touch sensor and a touch line.

It is another technical benefit of the present disclosure to provide a transparent display device that may improve uniformity of parasitic capacitance between touch lines.

In addition to the technical benefits of the present disclosure as mentioned above, additional technical benefits and features of the present disclosure will be clearly understood by those skilled in the art from the following description of the present disclosure.

In accordance with an aspect of the present disclosure, the above and other technical benefits can be accomplished by the provision of a transparent display device with a touch sensor, the transparent display device comprising a substrate provided with a transmissive area and a non-transmissive area, a touch sensor provided in the transmissive area over the substrate, including a touch sensor electrode, a pixel provided in the non-transmissive area over the substrate, including a plurality of light emitting elements comprised of an anode electrode, a light emitting layer and a cathode electrode, a first signal line extended from the non-transmissive area in a first direction, a first touch line provided between the first signal line and the transmissive area, and a second touch line provided between the first touch line and the transmissive area. The first touch line is disposed to have a first spaced distance from the first signal line, the second touch line is disposed to have a second spaced distance from the first touch line, and the first spaced distance may be greater than the second spaced distance.

In accordance with another aspect of the present disclosure, the above and other technical benefits can be accomplished by the provision of a transparent display device with a touch sensor, the transparent display device comprising a substrate provided with a transmissive area and a non-transmissive area, a touch sensor provided in the transmissive area over the substrate, a pixel provided in the non-transmissive area over the substrate, including a plurality of light emitting elements comprised of an anode electrode, a light emitting layer and a cathode electrode, a pixel power line extended from the non-transmissive area in a first direction, supplying a first power source to the anode electrode of each of the plurality of light emitting elements, first and second touch lines provided between the pixel power line and the transmissive area and extended in the first direction, and a scan line extended from the non-transmissive area in a second direction, supplying a scan signal to each of the plurality of light emitting elements. The first touch line and the second touch line may have their respective areas different from each other, which overlap at least part of the scan line.

BRIEF DESCRIPTION OF THE SEVERAL VIEWS OF THE DRAWINGS

The above and other technical benefits, features and other advantages of the present disclosure will be more clearly understood from the following detailed description taken in conjunction with the accompanying drawings, in which.

DETAILED DESCRIPTION

Figure 1:
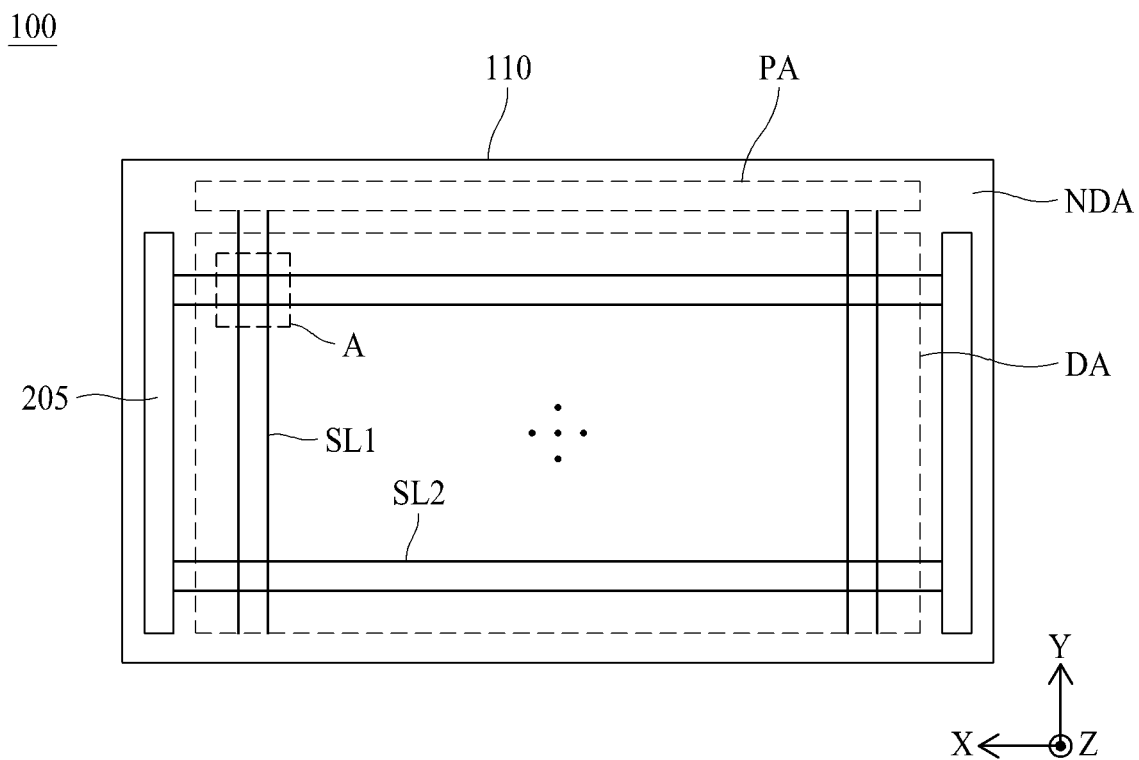
FIG. 1 is a schematic plan view illustrating a transparent display panel.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted. In a case where 'comprise,' 'have,' and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~','above~', 'below~,' and 'next to~,' one or more portions may be arranged between two other portions unless 'just' or 'direct' is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," etc., may be used. These terms are intended to identify the corresponding elements from the other elements, and basis, order, or number of the corresponding elements are not limited by these terms. The expression that an element is "connected" or "coupled" to another element should be understood as that the element may directly be connected or coupled to another element when mentioned explicitly, or a third element may otherwise be interposed between the corresponding elements.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

FIG. 1 is a schematic plan view illustrating a transparent display panel.

Hereinafter, X axis indicates a line parallel with a scan line, Y axis indicates a line parallel with a data line, and Z axis indicates a height direction of a transparent display device 100.

Although a description has been described based on that the transparent display device 100 according to one embodiment of the present disclosure is embodied as an organic light emitting display device, the transparent display device 100 may be embodied as a liquid crystal display device, a plasma display panel (PDP), a Quantum dot Light Emitting Display (QLED) or an Electrophoresis display device.

Referring to FIG. 1, a transparent display device according to one embodiment of the present disclosure includes a transparent display panel 110. The transparent display panel 110 may include a display area DA provided with pixels to display an image, and a non-display area NDA for not displaying an image.

The display area DA may be provided with a first signal lines SL1, a second signal lines SL2 and the pixels. The non-display area NDA may be provided with a pad area PA in which pads are disposed, and at least one gate driver 205.

The first signal lines SL1 may be extended in a first direction (e.g., Y-axis direction). The first signal lines SL1 may cross the second signal lines SL2 in the display area DA. The second signal lines SL2 may be extended in the display area DA in a second direction (e.g., X-axis direction). The pixel may be provided in an area where the first signal line SL1 is provided or in an area where the first signal line SL1 and the second signal line SL2 cross each other, and emits predetermined or selected light to display an image.

The gate driver 205 are connected to the scan lines and supplies scan signals to the scan lines. The gate driver 205 may be disposed in the non-display area NDA on one side or both sides of the display area DA of the transparent display panel 110 by a gate driver in panel (GIP) method or a tape automated bonding (TAB) method.

The transparent display panel 110 may further include a touch line and a touch sensor in addition to the first signal line SL1, the second signal line SL2 and the pixel in order to implement a touch function. A detailed description of the touch line and the touch sensor will be described later with reference to FIGS. 2 to 16.

Figure 2:
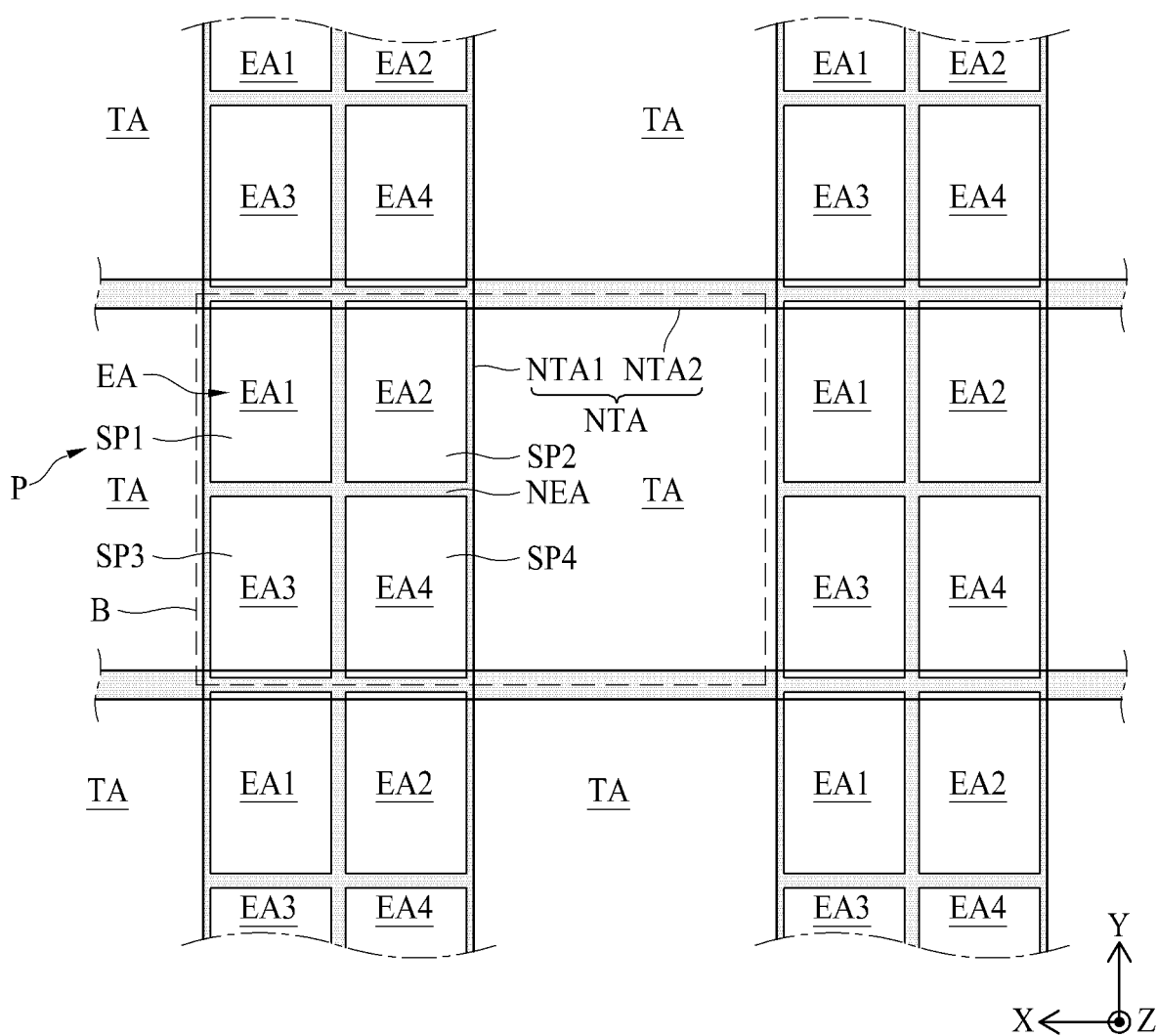
FIG. 2 is a schematic view illustrating an example of a pixel provided in an area A of FIG. 1.
Figure 3:
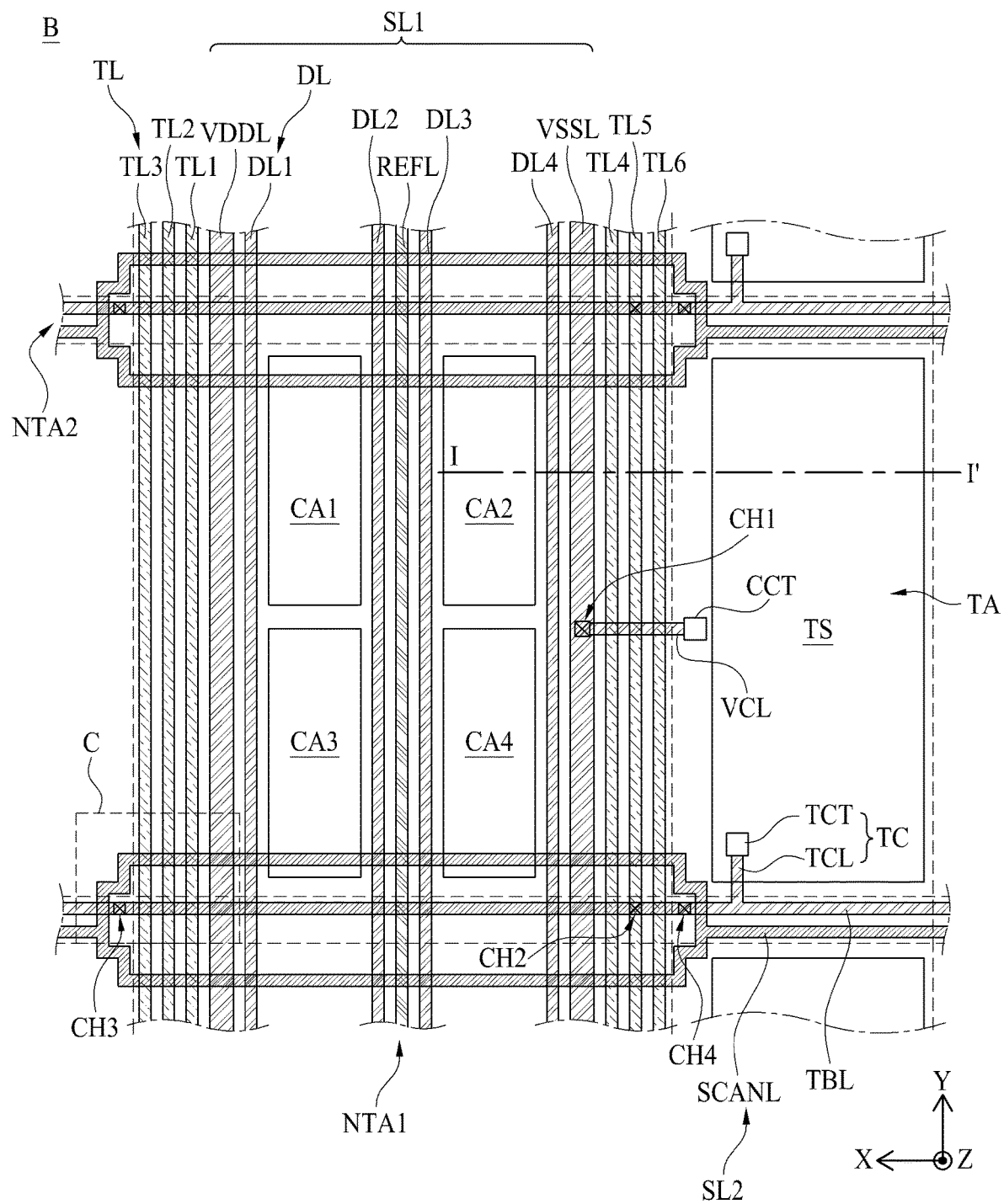
FIG. 3 is a view illustrating an example of signal lines, touch lines and a touch sensor, which are provided in an area B of FIG. 2.

FIG. 2 is a schematic view illustrating an example of a pixel provided in an area A of FIG. 1 and FIG. 3 is a view illustrating an example of signal lines, touch lines and a touch sensor, which are provided in an area B of FIG. 2.

Referring to FIGS. 2 and 3, the display area DA includes a transmissive area TA and a non-transmissive area NTA. The transmissive area TA is an area through which most of externally incident light passes, and the non-transmissive area NTA is an area through which most of externally incident light fails to transmit. For example, the transmissive area TA may be an area where light transmittance is greater than α%, for example, about 90%, and the non-transmissive area NTA may be an area where light transmittance is smaller than β%, for example, about 50%. At this time, a is greater than β. A user may view an object or background arranged over a rear surface of the transparent display panel 110 due to the transmissive area TA.

The non-transmissive area NTA may include a first non-transmissive area NTA1, a second non-transmissive area NTA2 and a plurality of pixels P. Pixels P may be provided in the first non-transmissive area NTA1 or in an overlapping area where the first non-transmissive area NTA1 and a second non-transmissive area NTA2 overlap, and emit predetermined or selected light to display an image. A light emission area EA may correspond to an area, from which light is emitted, in the pixel P.

Each of the pixels P, as shown in FIG. 2, may include at least one of a first subpixel SP1, a second subpixel SP2, a third subpixel SP3 and a fourth subpixel SP4. The first subpixel SP1 may include a first light emission area EA1 emitting light of a first color. The second subpixel SP2 may include a second light emission area EA2 emitting light of a second color. The third subpixel SP3 may include a third light emission area EA3 emitting light of a third color. The fourth subpixel SP4 may include a fourth light emission area EA4 emitting light of a fourth color.

The first to fourth light emission area EA1, EA2, EA3 and EA4 may emit light of different colors. For example, the first light emission area EA1 may emit light of a green color. The second light emission area EA2 may emit light of a red color. The third light emission area EA3 may emit light of a blue color. The fourth light emission area EA4 may emit light of a white color. However, the light emission areas are not limited to this example. Each of the pixels P may further include a subpixel emitting light of a color other than red, green, blue and white. Also, the arrangement order of the subpixels SP1, SP2, SP3 and SP4 may be changed in various ways.

The first non-transmissive area NTA1 may be extended in a first direction (Y-axis direction) in a display area DA, and may be disposed to at least partially overlap light emission areas EA1, EA2, EA3 and EA4. A plurality of first non-transmissive areas NTA1 may be provided in the transparent display panel 110, and a transmissive area TA may be provided between two adjacent first non-transmissive areas NTA1. In the first non-transmissive area NTA1, first signals lines SL1 extended in the first direction (Y-axis direction) and touch lines TL extended in the first direction (Y-axis direction) may be disposed to be spaced apart from each other.

For example, the first signal lines SL1 may include at least one of a pixel power line VDDL, a common power line VSSL, a reference line REFL and data lines DL1, DL2, DL3 and DL4.

The pixel power line VDDL may supply a first power source to a driving transistor DTR of each of subpixels SP1, SP2, SP3 and SP4 provided in the display area DA. The first power source may be an anode power source.

The common power line VSSL may supply a second power source to a cathode electrode of the subpixels SP1, SP2, SP3 and SP4 provided in the display area DA. At this time, the second power source may be a cathode power source. The cathode power source may be a common power source commonly supplied to the subpixels SP1, SP2, SP3 and SP4.

The common power line VSSL may supply the cathode power source to the cathode electrode through a cathode contact portion CCT. The cathode contact portion CCT may be provided between the transmissive area TA and the common power line VSSL. A power connection line VCL may be disposed between the common power line VSSL and the cathode contact portion CCT. One end of the power connection line VCL may be connected to the common power line VSSL through a first contact hole CH1 and the other end thereof may be connected to the cathode contact portion CCT. The cathode electrode may be connected to the cathode contact portion CCT. As a result, the cathode electrode may be electrically connected to the common power line VSSL through the power connection line VCL and the cathode contact portion CCT.

The reference line REFL may supply an initialization voltage (or reference voltage) to the driving transistor DTR of each of the subpixels SP1, SP2, SP3 and SP4 provided in the display area DA. The reference line REFL may be disposed between the plurality of data lines DL1, DL2, DL3 and DL4. For example, the reference line REFL may be disposed at the center of the plurality of data lines DL1, DL2, DL3 and DL4, that is, between the second data line DL2 and the third data line DL3.

The reference line REFL may be diverged and connected to the plurality of subpixels SP1, SP2, SP3 and SP4. In detail, the reference line REFL may be connected to circuit elements of the plurality of subpixels SP1, SP2, SP3 and SP4 to supply an initialization voltage (or reference voltage) to each of the subpixels SP1, SP2, SP3 and SP4.

When the reference line REFL is disposed to be close to the edge of the first non-transmissive area NTA1, a deviation between connection lengths from a diverged point to a circuit element of a plurality of subpixels SP1, SP2, SP3 and SP4 is increased. In a transparent display panel 110 according to one embodiment of the present disclosure, the reference line REFL is disposed in a middle area of the first non-transmissive area NTA1, whereby the deviation between the connection lengths to the circuit element of each of the plurality of subpixels SP1, SP2, SP3 and SP4 may be reduced or minimized. Therefore, the reference line REFL may uniformly supply signals to the circuit elements of the plurality of subpixels SP1, SP2, SP3 and SP4.

Each of the data lines DL1, DL2, DL3 and DL4 may supply a data voltage to the subpixels SP1, SP2, SP3 and SP4. For example, the first data line DL1 may supply a first data voltage to a first driving transistor of the first subpixel SP1, the second data line DL2 may supply a second data voltage to a second driving transistor of the second subpixel SP2, the third data line DL3 may supply a third data voltage to a third driving transistor of the third subpixel SP3 and the fourth data line DL4 may supply a fourth data voltage to a fourth driving transistor of the fourth subpixel SP4.

In the transparent display panel 110 according to one embodiment of the present disclosure, the touch line TL may be further disposed in the first non-transmissive area NTA1. At least two touch lines TL may be provided in one first non-transmissive area NTA1. When the plurality of touch lines TL are disposed in the transmissive area TA of the transparent display panel 110, light transmittance may be deteriorated due to the plurality of touch lines TL.

Also, a slit, specifically an elongated linear or rectangular shape, may be provided between the plurality of touch lines TL. When external light passes through the slit, a diffraction phenomenon may occur. According to the diffraction phenomenon, light corresponding to plane waves may be changed to spherical waves as the light passes through the slit, and an interference phenomenon may occur in the spherical waves. Therefore, constructive interference and destructive interference occur in the spherical waves, whereby the external light that has passed through the slit may have irregular light intensity. As a result, in the transparent display panel 110, definition of an object or image positioned at an opposite side may be reduced.

For this reason, the plurality of touch lines TL are preferably disposed in the first non-transmissive area NTA1 rather than the transmissive area TA. However, in the transparent display panel 110, a size of the non-transmissive area NTA is very smaller than that of a general display panel, and a plurality of signal lines, a circuit element and a light emitting element are all formed in such a small area. Therefore, there is a spatial restriction in arrangement of the plurality of touch lines TL in the non-transmissive area NTA, and a problem due to an increase in parasitic capacitance may occur due to a close distance between the plurality of touch lines and the other signal lines.

The transparent display panel 110 according to one embodiment of the present disclosure proposes an arrangement structure that may reduce an average value of parasitic capacitance and improve uniformity of parasitic capacitance when a plurality of touch lines TL are disposed in a non-transmissive area NTA. A detailed description of the arrangement structure of the touch lines TL will be described later with reference to FIGS. 8 to 16.

A plurality of touch lines TL may be disposed between first signal lines SL1 in the first non-transmissive area NTA1 and a transmissive area TA as shown in FIG. 3. For example, six touch lines TL1, TL2, TL3, TL4, TL5 and TL6 may be disposed in one first non-transmissive area NTA1. Three touch lines TL1, TL2 and TL3 of the six touch lines TL1, TL2, TL3, TL4, TL5 and TL6 may be disposed between a pixel power line VDDL and the transmissive area TA, and the other three touch lines TL4, TL5 and TL6 may be disposed between a common power line VSSL and the transmissive area TA, but are not limited to this arrangement. The plurality of touch lines TL are arranged advantageously so as not to overlap circuit areas CA1, CA2, CA3 and CA4 in which circuit elements are disposed, and various modifications may be made in the arrangement order of the plurality of touch lines TL with the first signal lines SL1.

The transparent display panel 110 according to one embodiment of the present disclosure includes a pixel P between adjacent transmissive areas TA, and the pixel P may include light emission areas EA1, EA2, EA3 and EA4 in which a light emitting element is disposed to emit light. Since a size of the non-transmissive area NTA is small in the transparent display panel 110, the circuit element may be disposed to at least partially overlap the light emission areas EA1, EA2, EA3 and EA4. That is, the light emission areas EA1, EA2, EA3 and EA4 may include circuit areas CA1, CA2, CA3 and CA4 in which circuit elements are disposed.

For example, the circuit areas may include a first circuit area CA1 in which a circuit element connected to the first subpixel SP1 is disposed, a second circuit area CA2 in which a circuit element connected to the second subpixel SP2 is disposed, a third circuit area CA3 in which a circuit element connected to the third subpixel SP3 is disposed, and a fourth circuit area CA4 in which a circuit element connected to the fourth subpixel SP4 is disposed.

In the transparent display panel 110 according to one embodiment of the present disclosure, a plurality of touch lines TL do not overlap circuit areas CA1, CA2, CA3 and CA4, so that parasitic capacitance of the touch lines TL due to a circuit element may be reduced or minimized.

Furthermore, the transparent display panel 110 according to one embodiment of the present disclosure may reduce a horizontal distance difference between the touch lines TL. Since at least two transistors and a capacitor are disposed in the circuit areas CA1, CA2, CA3 and CA4, the touch lines TL may be difficult to be formed in a straight line in the circuit areas CA1, CA2, CA3, and CA4, and may be difficult to have a constant horizontal distance. Therefore, the horizontal distance difference between the touch lines TL is increased, whereby uniformity of the parasitic capacitance may be very low.

In the transparent display panel 110 according to one embodiment of the present disclosure, the touch lines TL may be disposed so as not to overlap the circuit areas CA1, CA2, CA3 and CA4, whereby an influence of the circuit element may be reduced and at the same time the horizontal distance difference between the touch lines TL may be reduced to improve uniformity of the parasitic capacitance.

The second non-transmissive area NTA2 may be extended in the display area DA in a second direction (X-axis direction), and may be disposed to at least partially overlap the light emission areas EA1, EA2, EA3 and EA4. A plurality of second non-transmissive areas NTA2 may be provided in the transparent display panel 110, and the transmissive area TA may be provided between two adjacent second non-transmissive areas NTA2. The second signal line SL2 and a touch bridge line TBL may be disposed to be spaced apart from each other in the second non-transmissive area NTA2.

A second signal line SL2 may be extended in a second direction (X-axis direction), and may include, for example, a scan line SCANL. The scan line SCANL may supply a scan signal to the subpixels SP1, SP2, SP3 and SP4 of the pixel P.

A touch bridge line TBL may connect any one of the plurality of touch lines TL with a touch sensor TS. The touch bridge line TBL may be connected to any one of the plurality of touch lines TL through a second contact hole CH2. Further, the touch bridge line TBL may be connected to at least two touch sensors TS extended in the second direction (X-axis direction) while being extended in the second direction (X-axis direction).

In one embodiment, the touch bridge line TBL may include a plurality of layers, e.g., two layers. The touch bridge line TBL may include a first touch bridge line disposed in a first layer in an area overlapped with the first non-transmissive area NTA1 and a second touch bridge line disposed in a second layer in an area that is not overlapped with the first non-transmissive area NTA1. One first touch bridge line may be connected to one second touch bridge line at one end through a third contact hole CH3, and may be connected to another second touch bridge line at the other end through a fourth contact hole CH4. For example, the first layer may be the same layer as a gate electrode of a driving transistor, and the second layer may be the same layer as a source electrode and a drain electrode of the driving transistor.

In the transparent display panel 110 according to one embodiment of the present disclosure, a plurality of touch lines TL may be disposed in the first non-transmissive area NTA1 that is not a second non-transmissive area NTA2, whereby light transmittance may be prevented from being deteriorated due to the plurality of touch lines TL. The second non-transmissive area NTA2 extended in the second direction (X-axis direction) crosses between adjacent transmissive areas TA as shown in FIG. 3. When a width of the second non-transmissive area NTA2 crossing the transmissive areas TA is increased, a size of the transmissive area TA is necessarily reduced.

When the plurality of touch lines TL are disposed in the second non-transmissive area NTA2, the width of the second non-transmissive area NTA2 is increased to dispose a large number of lines, and the size of the transmissive area TA is reduced. That is, a problem may occur in that light transmittance of the transparent display panel 110 is reduced due to the plurality of touch lines TL.

In the transparent display panel 110 according to one embodiment of the present disclosure, the plurality of touch lines TL are disposed in the first non-transmissive area NTA1, and only one touch bridge line TBL for connecting the plurality of touch sensors TS are provided in the second non-transmissive area NTA2. Therefore, the transparent display panel 110 according to one embodiment of the present disclosure may reduce or minimize the size decrease of the transmissive area TA or decrease in light transmittance due to the plurality of touch lines TL and the touch bridge line TBL.

The touch sensor TS may be provided in the transmissive area TA. The touch sensor TS may be disposed in each of the plurality of transmissive areas TA, and may be changed in capacitance during user contact. A touch driver (not shown) may be connected to the plurality of touch sensors TS through the plurality of touch lines TL to detect a change in capacitance of the plurality of touch sensors TS.

Each of the plurality of touch sensors TS may be connected to the touch bridge lines TBL through a touch connection portion TC. The touch connection portion TC may at least partially overlap the touch sensor TS at one end and at least partially overlap the touch bridge lines TBL at the other end for connecting the touch sensor TS and the touch bridge line TBL. The touch connection portion TC may include a touch connection line TCL and a touch contact electrode TCT.

The touch connection line TCL may connect the touch bridge line TBL and the touch sensor TS. In detail, the touch connection line TCL may be connected to the touch bridge line TBL at one end and may be connected to the touch contact electrode TCT through the contact hole at the other end. The touch contact electrode TCT may be provided in the transmissive area TA and may be connected to the touch sensor TS. Accordingly, the touch connection line TCL may be connected to the touch sensor TS through the touch contact electrode TCT.

Hereinafter, a connection relation among a plurality of touch sensors TS, a plurality of touch lines TL and a plurality of touch bridge lines TBL will be described in more detail with reference to FIGS. 4 and 5.

Figure 4:
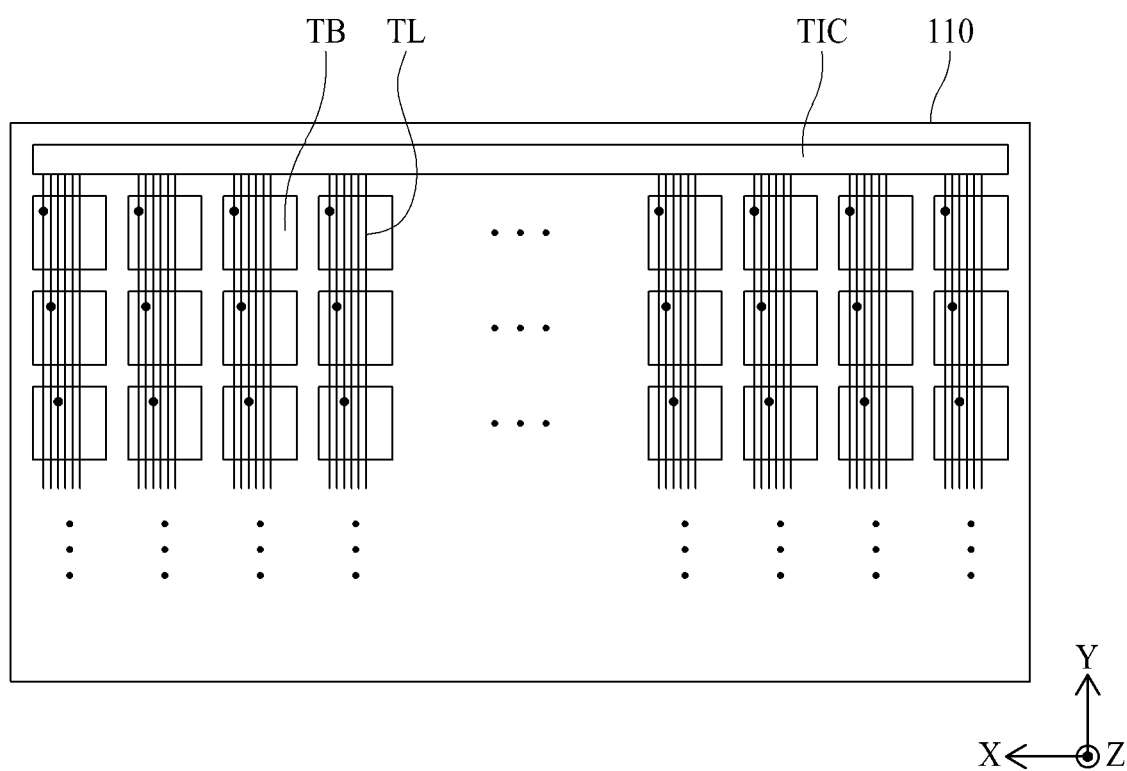
FIG. 4 is a view illustrating a connection relation between a plurality of touch blocks and a plurality of touch lines.
Figure 5:
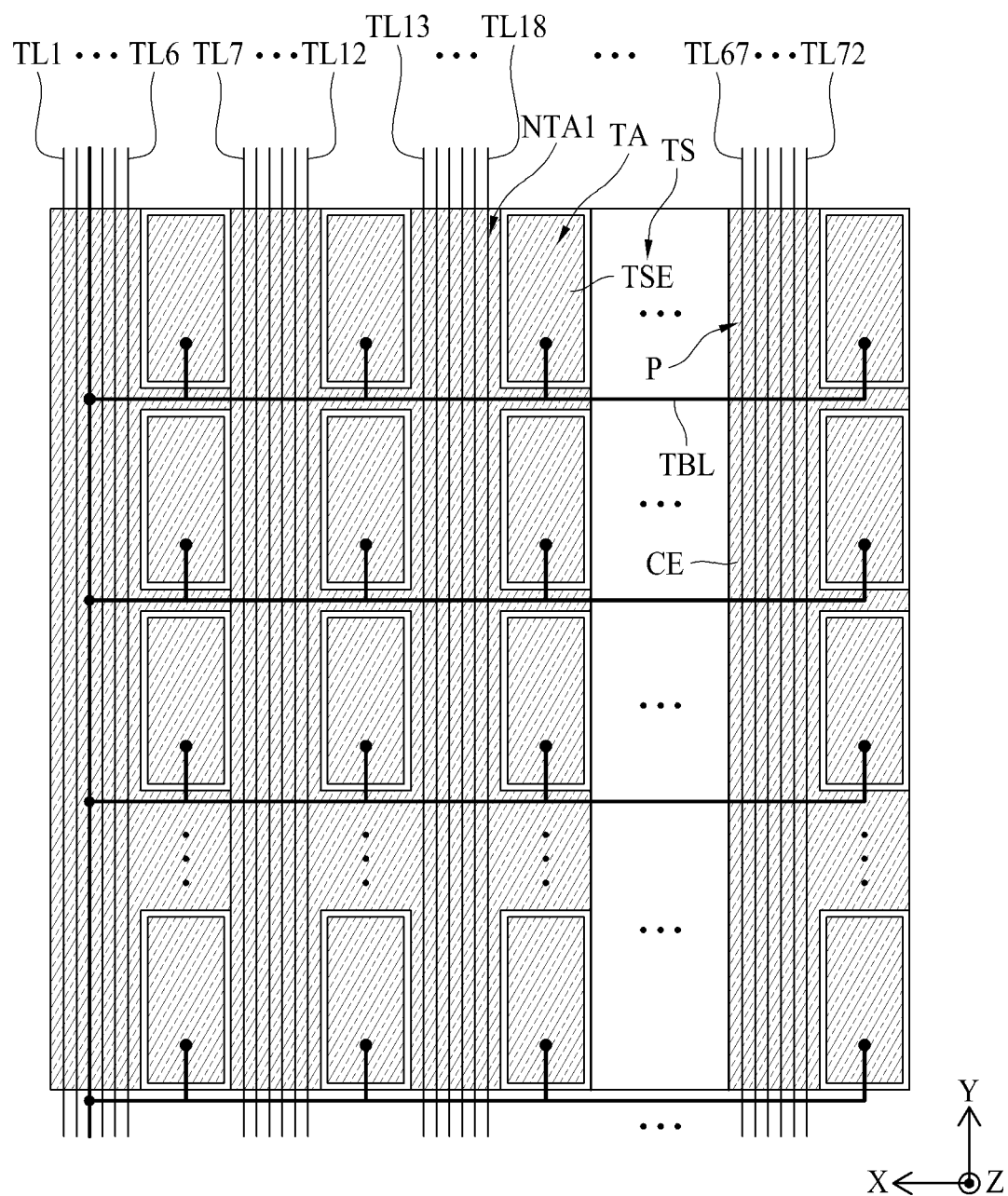
FIG. 5 is a view illustrating a connection relation between a plurality of touch lines and a plurality of touch sensors in one touch block.

FIG. 4 is a view illustrating a connection relation between a plurality of touch blocks and a plurality of touch lines, and FIG. 5 is a view illustrating a connection relation between a plurality of touch lines and a plurality of touch sensors in one touch block.

Referring to FIGS. 4 to 5, the transparent display panel 110 according to one embodiment of the present disclosure may include a plurality of touch blocks TB. Each of the plurality of touch blocks TB may include a plurality of pixels P and a plurality of transmissive areas TA disposed to correspond to the plurality of pixels P one-to-one as a basic unit for determining a user touch position. For example, each of the plurality of touch blocks TB may include 12×15 pixels P and 12×15 touch sensors TS. In this case, when image resolution is 1920×1080, touch resolution may be 160×72.

At this time, the touch sensor TS may include a touch sensor electrode TSE. The touch sensor electrode TSE may include the same material in the same layer as the cathode electrode CE of the pixel P. In this case, the touch sensor electrode TSE and the cathode electrode CE may be disposed to be spaced apart from each other.

In the transparent display panel 110 according to one embodiment of the present disclosure, as each of the plurality of touch lines TL is connected to one of the plurality of touch blocks TB, a change in capacitance of the touch sensors TS provided in the connected touch block TB may be sensed. That is, the plurality of touch lines TL provided in the transparent display panel 110 may correspond to the plurality of touch blocks TB one-to-one. Therefore, the number of touch lines TL may be the same as the number of touch blocks TB in the transparent display panel 110. For example, when the number of touch blocks TB is 160×72, the touch line TL may also be 160×72, and may be connected to the touch driver TIC.

As described above, in order to form the touch lines TL as much as the number of touch blocks TB, at least two touch lines TL should be provided in one first non-transmissive area NTA1. For example, when image resolution is 1920×1080 and touch resolution is 160×72, six touch lines TL1, TL2, TL3, TL4, TL5 and TL6 may be provided in one first non-transmissive area NTA1, as shown in FIG. 3, in order to form 160×72 touch lines TL in the transparent display panel 110.

The plurality of touch sensors TS provided in one touch block TB may be connected to one of the plurality of touch lines TL provided in one touch block TB as shown in FIG. 5. For example, twelve first non-transmissive areas NTA1 may be provided in one touch block TB, and six touch lines TL1, TL2, TL3, TL4, TL5 and TL6 may be disposed in each of the twelve first non-transmissive areas NTA1. As a result, one touch block TB may be provided with 72 touch lines TL1, . . . , TL72. In this case, the plurality of touch sensors TS provided in one touch block TB may be connected to one specific touch line TL of the 72 touch lines TL1, . . . , TL72. At this time, the specific touch line TL may be connected to the plurality of touch sensors TS arranged in the second direction (X-axis direction) through the touch bridge lines TBL extended in the second direction (X-axis direction). As a result, the plurality of touch sensors TS provided in one touch block TB may be electrically connected through a specific touch line TL and the touch bridge lines TBL.

Each of the plurality of touch lines TL may correspond to touch blocks TB one-to-one. Therefore, the plurality of touch blocks TB are connected to different touch lines and thus may be electrically separated from each other. Each touch line TL may connect a plurality of touch sensors TS provided in a corresponding touch block TB to a touch driver TIC. In detail, each touch line TL may transmit the changed capacitance provided from the touch sensors TS provided in the touch block TB to the touch driver TIC. The touch driver TIC may sense the changed capacitance, and may determine a touch position of a user. Also, each touch line TL may provide the sensing voltage generated from the touch driver TIC to the touch sensors TS provided in the touch block TB.

Hereinafter, light emitting elements of a light emission area EA and the touch sensors TS of the transmissive area TA will be described in more detail with reference to FIGS. 6 to 7.

Figure 6:
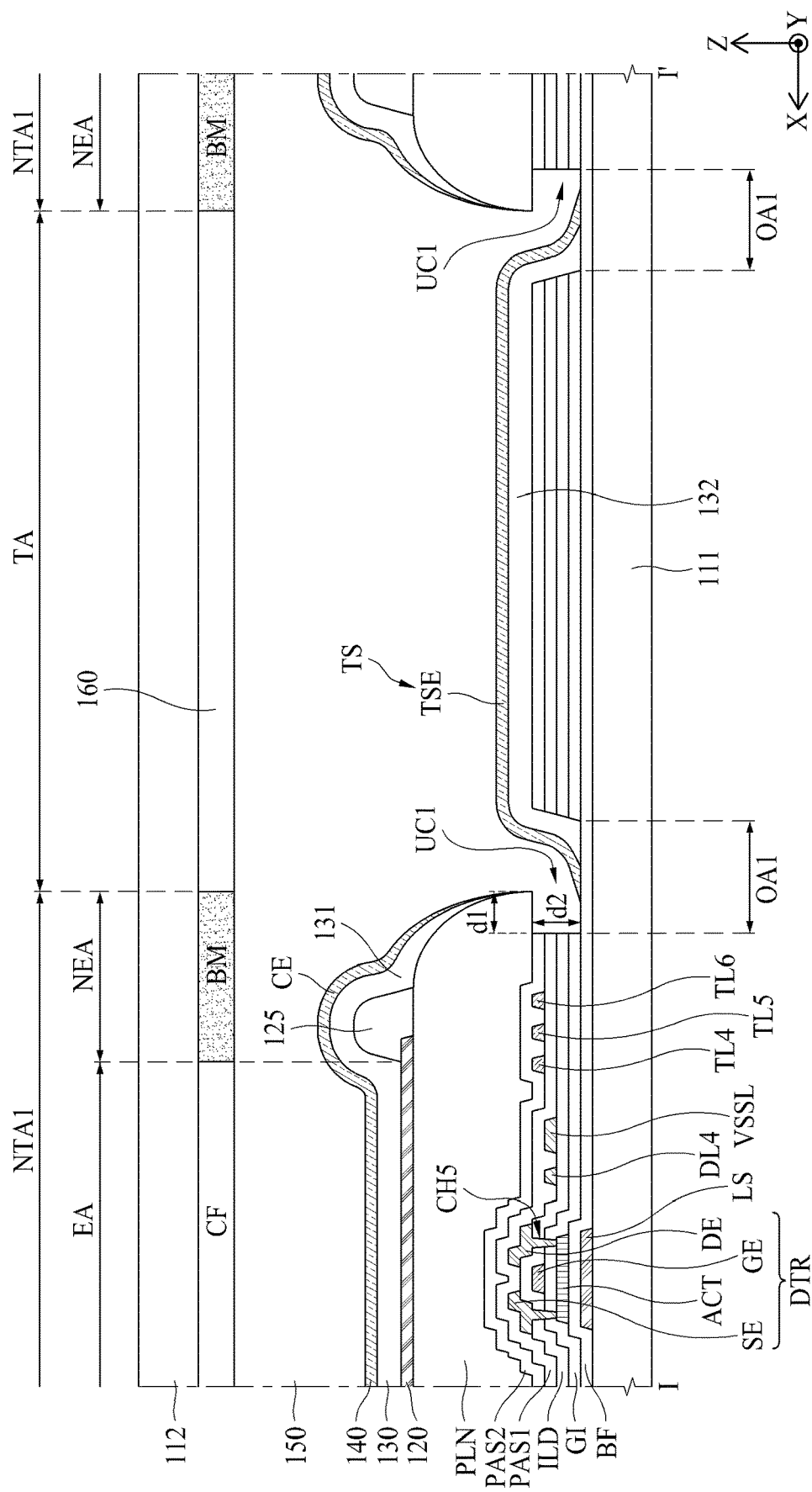
FIG. 6 is a cross-sectional view illustrating an example of line I-I' of FIG. 3.
Figure 7:
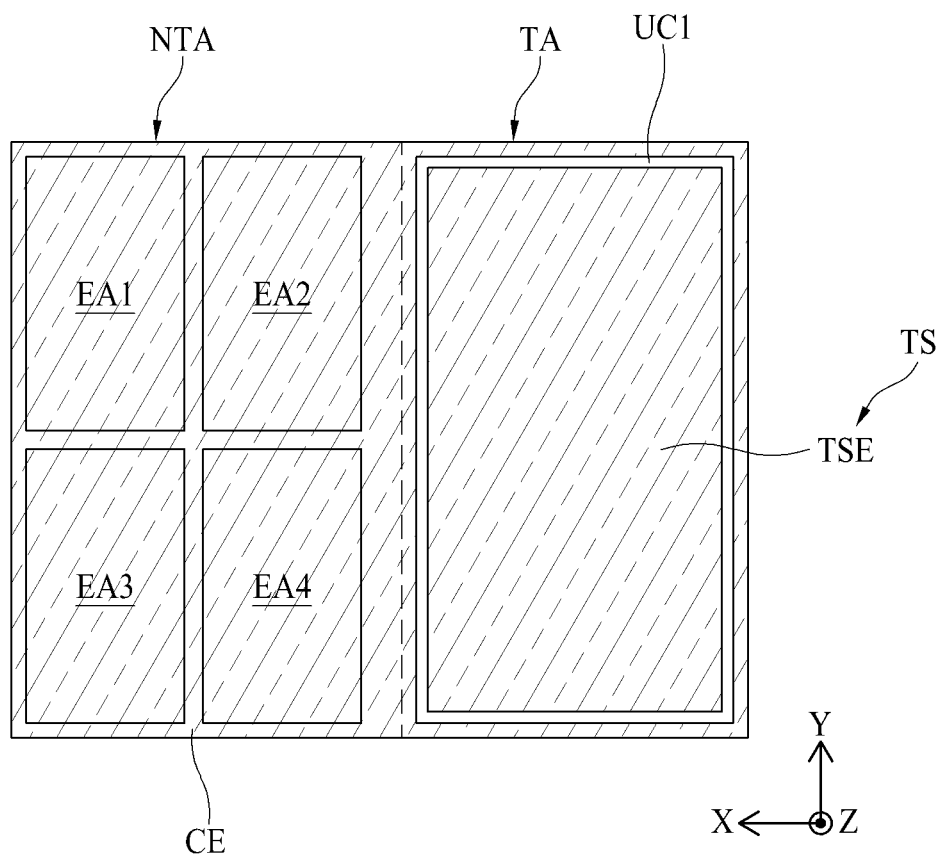
FIG. 7 is a view illustrating an example that a cathode electrode and a touch sensor electrode are disposed.

FIG. 6 is a cross-sectional view illustrating an example of line I-I' of FIG. 3, and FIG. 7 is a view illustrating an example that a cathode electrode and a touch sensor electrode are disposed.

Referring to FIGS. 3 and 6 to 7, the first non-transmissive area NTA1 includes a circuit area CA1, CA2, CA3 and CA4 in which at least one transistor and a capacitor are disposed, and a pixel power line VDDL, a common power line VSSL, a reference line REFL, data lines DL and touch lines TL, which are extended in a first direction (Y-axis direction) and provided so as not to overlap the circuit areas CA1, CA2, CA3 and CA4. The second non-transmissive area NTA2 may include a scan line SCANL and a touch bridge line TBL, which are extended in a second direction (X-axis direction).

At least one transistor may include a drive transistor DTR and switching transistors. The switching transistors may be switched in accordance with a scan signal supplied to the scan line SCANL to charge a data voltage supplied from the data line DL in the capacitor or supply a reference voltage to the driving transistor DTR.

The driving transistor DTR is switched in accordance with the data voltage charged in the capacitor to generate a data current from a power source supplied from the pixel power line VDDL and supply the data current to a first electrode 120 of the subpixels SP1, SP2, SP3 and SP4. The driving transistor DTR may include an active layer ACT, a gate electrode GE, a source electrode SE, and a drain electrode DE.

As shown in FIG. 6, a light shielding layer LS may be provided over the first substrate 111. The light shielding layer LS may serve to shield external light incident on an active layer ACT in an area in which a driving transistor DTR is provided. The light shielding layer LS may include a single layer or multi-layer made of any one of molybdenum (Mo), aluminum (Al), chromium (Cr), gold (Au), titanium (Ti), nickel (Ni), neodymium (Nd) and copper (Cu), or their alloy.

The transparent display panel 110 according to one embodiment of the present disclosure may form at least one of the pixel power line VDDL, the common power line VSSL, the reference line REFL, the data lines DL, the touch lines TL, the scan line SCANL and the touch bridge line TBL in the same layer as the light shielding layer LS. For example, the scan line SCANL may include the same material as that of the light shielding layer LS and may be provided in the same layer as the light shielding layer LS, but are not limited thereto.

A buffer layer BF may be provided over the light shielding layer LS. The buffer layer BF is to protect the transistors DTR from water permeated through the first substrate 111 vulnerable to water permeation, and may include an inorganic layer, for example, a silicon oxide layer (SiOx), a silicon nitride layer (SiNx) or a multi-layer of the silicon oxide layer and the silicon nitride layer.

The active layer ACT of the driving transistor DTR may be provided over the buffer layer BF. The active layer ACT may include a silicon-based semiconductor material or an oxide-based semiconductor material.

A gate insulating layer GI may be provided over the active layer ACT of the driving transistor DTR. The gate insulating layer GI may be provided in the non-transmissive area NTA and the transmissive area TA. However, in order to form the first undercut structure UC1 in the transmissive area TA, the gate insulating layer GI may be provided with a first opening area OA1 that is provided to expose the buffer layer BF without being provided in at least a portion of the transmissive area TA. The gate insulating layer GI may include an inorganic layer, for example, a silicon oxide layer (SiOx), a silicon nitride layer (SiNx) or a multi-layer of the silicon oxide layer and the silicon nitride layer.

A gate electrode GE of the driving transistor DTR may be provided over the gate insulating layer GI. The gate electrode GE may include a single layer or multi-layer made of one of molybdenum (Mo), aluminum (Al), chromium (Cr), gold (Au), titanium (Ti), nickel (Ni), neodymium (Nd) and copper (Cu), or their alloy.

An interlayer dielectric layer ILD may be provided over the gate electrode GE of the driving transistor DTR. The interlayer dielectric layer ILD may be provided in the non-transmissive area NTA and the transmissive area TA. However, the interlayer dielectric layer ILD may be provided with a first opening area OA1, which exposes the buffer layer BF without being provided in at least a portion of the transmissive area TA, to form a first undercut structure UC1 in the transmissive area TA. The interlayer dielectric layer ILD may include an inorganic layer, for example, a silicon oxide layer (SiOx), a silicon nitride layer (SiNx) or a multi-layer of the silicon oxide layer and the silicon nitride layer.

A source electrode SE and a drain electrode DE of the driving transistor DTR may be provided over the interlayer dielectric layer ILD. The source electrode SE and the drain electrode DE of the driving transistor DTR may be connected to the active layer ACT of the driving transistor DTR through a fifth contact hole CH5 passing through the gate insulating layer GI and the interlayer dielectric layer ILD. The source electrode SE and the drain electrode DE of the driving transistor DTR may include a single layer or multi-layer made of one of molybdenum (Mo), aluminum (Al), chromium (Cr), gold (Au), titanium (Ti), nickel (Ni), neodymium (Nd) and copper (Cu), or their alloy.

In the transparent display panel 110 according to one embodiment of the present disclosure, at least one of the pixel power line VDDL, the common power line VSSL, the reference line REFL, the data lines DL, the touch lines TL and the scan line SCANL and the touch bridge line TBL may be provided in the same layer as the source electrode SE and the drain electrode DE of the driving transistor DTR. For example, the pixel power line VDDL, the common power line VSSL and the data lines DL may include the same material as that of the source electrode SE and the drain electrode DE in the same layer as the source electrode SE and the drain electrode DE, but are not limited thereto.

A first passivation layer PAS1 for insulating the driving transistor DTR may be provided over the source electrode SE and the drain electrode DE of the driving transistor DTR. A second passivation layer PAS2 may be provided over the first passivation layer PAS1. The first and second passivation layers PAS1 and PAS2 may be provided in the non-transmissive area NTA and the transmissive area TA. However, the first and second passivation layers PAS1 and PAS2 may be provided with a first opening area OA1, which exposes the buffer layer BF without being provided in at least a portion of the transmissive area TA, to form the first undercut structure UC1 in the transmissive area TA. The first opening area OA1 of the first and second passivation layers PAS1 and PAS2 may at least partially overlap with the first opening area OA1 of the interlayer dielectric layer ILD and the first opening area OA1 of the gate insulating layer GI. The first and second passivation layers PAS1 and PAS2 may include an inorganic layer, for example, a silicon oxide layer (SiOx), a silicon nitride layer (SiNx) or a multi-layer of the silicon oxide layer and the silicon nitride layer.

The planarization layer PLN may be provided over the second passivation layer PAS2 to planarize a step difference due to the driving transistor DTR and the plurality of signal lines. The planarization layer PLN may be provided in the non-transmissive area NTA, and may not be provided in at least a portion of the transmissive area TA to form the first undercut structure UC1 in the transmissive area TA. The planarization layer PLN may include an organic layer such as an acrylic resin, an epoxy resin, a phenolic resin, a polyamide resin and a polyimide resin.

In the transparent display panel 110 according to one embodiment of the present disclosure, the first undercut structure UC1 may be formed using the planarization layer PLN and the plurality of inorganic insulating layers, for example, the first and second passivation layers PAS1 and PAS2, the interlayer dielectric layer ILD and the gate insulating layer GI. In detail, the first undercut structure UC1 may be formed in such a manner that the planarization layer PLN is more protruded than the plurality of inorganic insulating layers, for example, the first and second passivation layers PAS1 and PAS2, the interlayer dielectric layer ILD and the gate insulating layer GI in a direction of the transmissive area TA. Therefore, the first undercut structure UC1 may expose at least a portion of the lower surface of the planarization layer PLN, and the plurality of inorganic insulating layers may not be provided below the exposed lower surface so that a gap space with the buffer layer BF may be provided.

The first undercut structure UC1 may be formed through a wet etching process. The wet etching process for forming the first undercut structure UC1 may be isotropic etching in view of properties. Therefore, in the first undercut structure UC1, a first gap distance d1 from an end of the planarization layer PLN to an end of the plurality of inorganic insulating layers may be formed in the same manner as a second gap distance d2 from the lower surface of the planarization layer PLN to the upper surface of the buffer layer BF. At this time, the first gap distance d1 of the first undercut structure UC1 should have a minimum or selected distance value, for example, 2 um or more in order to make sure of isolation between the cathode electrode CE and the touch sensor electrode TSE. Therefore, since the second gap distance d2 of the first undercut structure UC1 should be greater than or equal to 2 um, a sum of thicknesses of the passivation layer PAS, the interlayer dielectric layer ILD and the gate insulating layer GI may be 2 um or more.

The first undercut structure UC1 is provided in the transmissive area TA, and may have a planar closed shape. For example, the first undercut structure UC1 may be provided along an edge of the transmissive area TA. At this time, the first undercut structure UC1 may be provided to surround the touch sensor TS.

In the transparent display panel 110 according to one embodiment of the present disclosure, the first undercut structure UC1 may be formed using the planarization layer PLN and the plurality of inorganic insulating layers, whereby light transmittance may be prevented from being reduced due to the first undercut structure UC1.

A light emitting element, which includes a first electrode 120, an organic light emitting layer 130 and a second electrode 140, and a bank 125 may be provided over the planarization layer PLN.

The first electrode 120 may be provided over the planarization layer PLN for each of the subpixels SP1, SP2, SP3 and SP4. The first electrode 120 is not provided in the transmissive area TA. The first electrode 120 may be connected to the driving transistor DTR. In detail, the first electrode 120 may be connected to one of the source electrode SE and the drain electrode DE of the driving transistor DTR through a contact hole (not shown) that passes through the planarization layer PLN and the first and second passivation layers PAS1 and PAS2.

The first electrode 120 may include a metal material having high reflectance, such as a stacked structure (Ti/Al/Ti) of aluminum and titanium, a stacked structure (ITO/Al/ITO) of aluminum and ITO, an Ag alloy, a stacked structure (ITO/Ag alloy/ITO) of Ag alloy and ITO, a MoTi alloy, and a stacked structure (ITO/MoTi alloy/ITO) of MoTi alloy and ITO. The Ag alloy may be an alloy of silver (Ag), palladium (Pd), copper (Cu), etc. The MoTi alloy may be an alloy of molybdenum (Mo) and titanium (Ti). The first electrode 120 may be an anode electrode of the light emitting element.

The bank 125 may be provided over the planarization layer PLN. The bank 125 may be provided to at least partially cover an edge of the first electrode 120 and expose a portion of the first electrode 120. Therefore, the bank 125 may prevent a problem in which light emitting efficiency is deteriorated due to concentration of a current on an end of the first electrode 120.

The bank 125 may be adjacent light emission areas EA1, EA2, EA3 and EA4 of the subpixels SP1, SP2, SP3 and SP4. The light emission areas EA1, EA2, EA3 and EA4 of each of the subpixels SP1, SP2, SP3 and SP4 represent an area in which the first electrode 120, the organic light emitting layer 130 and the cathode electrode CE are sequentially stacked and holes from the first electrode 120 and electrons from the cathode electrode CE are combined with each other in the organic light emitting layer 130 to emit light. In this case, the area in which the bank 125 is provided may become the non-light emission area NEA because light is not emitted therefrom, and the area in which the bank 125 is not provided and the first electrode is exposed may become the light emission area EA.

The bank 125 may include an organic layer such as an acrylic resin, an epoxy resin, a phenolic resin, a polyamide resin, and a polyimide resin.

The organic light emitting layer 130 may be disposed over the first electrode 120. The organic light emitting layer 130 may include a hole transporting layer, a light emitting layer and an electron transporting layer. In this case, when a voltage is applied to the first electrode 120 and the cathode electrode CE, holes and electrons move to the light emitting layer through the hole transporting layer and the electron transporting layer, respectively and are combined with each other in the light emitting layer to emit light.

In one embodiment, the organic light emitting layer 130 may be a common layer commonly provided in the subpixels SP1, SP2, SP3 and SP4. In this case, the light emitting layer may be a white light emitting layer for emitting white light.

In another embodiment, the light emitting layer of the organic light emitting layer 130 may be provided for each of the subpixels SP1, SP2, SP3 and SP4. For example, a green light emitting layer for emitting green light may be provided in the first subpixel SP1, a red light emitting layer for emitting red light may be provided in the second subpixel SP2, a blue light emitting layer for emitting blue light may be provided in the third subpixel SP3, and a white light emitting layer for emitting white light may be provided in the fourth subpixel SP4. In this case, the light emitting layer of the organic light emitting layer 130 is not provided in the transmissive area TA.

An organic light emitting layer 130 may be separated between the non-transmissive area NTA and the transmissive area TA by the first undercut structure UC1. In detail, the organic light emitting layer 130 may be separated into an organic light emitting layer 131 provided in the non-transmissive area NTA and an organic light emitting layer 132 provided in the transmissive area TA by the first undercut structure UC1. That is, the organic light emitting layer 131 provided in the non-transmissive area NTA and the organic light emitting layer 132 provided in the transmissive area TA may be spaced apart from each other by the first undercut structure UC1.

A second electrode 140 may be disposed over the organic light emitting layer 130 and the bank 125. When the second electrode 140 is deposited on an entire surface, the second electrode 140 may be separated without being continuous between the non-transmissive area NTA and the transmissive area TA by the first undercut structure UC1. In detail, the second electrode 140 may be separated into a second electrode CE provided in the non-transmissive area NTA and a second electrode TSE provided in the transmissive area TA by the first undercut structure UC1.

In this case, the second electrode CE provided in the non-transmissive area NTA may be a cathode electrode CE, and is an element constituting a light emitting element. The cathode electrode CE may be connected to a cathode contact portion CCT to receive a power source from the common power line VSSL. The cathode electrode CE may be a common layer that is commonly provided in the subpixels SP1, SP2, SP3 and SP4 to apply the same voltage.

Also, the second electrode TSE provided in the transmissive area TA is a touch sensor electrode TSE, and may be an element constituting the touch sensor TS. The touch sensor electrode TSE may be connected to a second touch contact electrode TCT2 to provide a change in capacitance to the touch line TL.

The second electrode 140, which includes the cathode electrode CE and the touch sensor electrode TSE, may include a transparent conductive material (TCO) such as ITO and IZO, which may transmit light, or a semi-transmissive conductive material such as magnesium (Mg), silver (Ag) or an alloy of magnesium (Mg) and silver (Ag). When the second electrode 140 includes a semi-transmissive conductive material, light emitting efficiency may be increased by a micro cavity.

An encapsulation layer 150 may be provided over the light emitting elements and the touch sensors TS. The encapsulation layer 150 may be provided over the cathode electrode CE and the touch sensor electrode TSE to at least partially cover the cathode electrode CE and the touch sensor electrode TSE. The encapsulation layer 150 serves to prevent oxygen or water from being permeated into the organic light emitting layer 130, the cathode electrode CE and the touch sensor electrode TSE. To this end, the encapsulation layer 150 may include at least one inorganic layer and at least one organic layer.

A color filter CF may be provided over the encapsulation layer 150. The color filter CF may be provided over one surface of the second substrate 112 that faces the first substrate 111. In this case, the first substrate 111 provided with the encapsulation layer 150 and the second substrate 112 provided with the color filter CF may be bonded to each other by an adhesive layer 160. At this time, the adhesive layer 160 may be an optically clear resin (OCR) layer or an optically clear adhesive (OCA) film.

The color filter CF may be provided to be patterned for each of the subpixels SP1, SP2, SP3 and SP4. A black matrix BM may be provided between color filters CF. The black matrix BM may be disposed between the subpixels SP1, SP2, SP3 and SP4 to prevent a color mixture from occurring between adjacent subpixels SP1, SP2, SP3 and SP4. In addition, the black matrix BM may prevent light incident from the outside from being reflected by the plurality of lines, for example, the scan lines SCANL, the pixel power line VDDL, the common power line VSSL, the reference line REFL, data lines DL, etc., provided between the subpixels SP1, SP2, SP3 and SP4.

In the transparent display panel 110 according to one embodiment of the present disclosure, the touch sensor electrode TSE of the touch sensor TS and the cathode electrode CE of the light emitting element may be formed in the same layer using a first undercut structure UC1. In the transparent display panel 110 according to one embodiment of the present disclosure, a touch process is simplified, and a separate mask for the touch sensor electrode TSE is not required.

Also, in the transparent display panel 110 according to one embodiment of the present disclosure, the first undercut structure UC1 may be formed using the planarization layer PLN and the plurality of inorganic insulating layers, whereby the first undercut structure UC1 may be formed without loss of light transmittance.

Also, in the transparent display panel 110 according to one embodiment of the present disclosure, the touch lines TL may be disposed below the light emitting element, whereby light emitting efficiency of the pixel P may be prevented from being deteriorated due to the touch lines TL.

Also, in the transparent display panel 110 according to one embodiment of the present disclosure, the touch lines TL may be disposed so as not to overlap the circuit areas CA1, CA2, CA3 and CA4, whereby influence caused by the circuit element may be minimized or reduced and at the same time uniformity of parasitic capacitance may be improved.

Also, in the transparent display panel 110 according to one embodiment of the present disclosure, the plurality of touch lines TL may be disposed in the first non-transmissive area NTA1, and only one touch bridge line TBL for connecting the plurality of touch sensors TS may be provided in the second non-transmissive area NTA2, whereby decrease in a size of the transmissive area TA or decrease in light transmittance due to the plurality of touch lines TL and the touch bridge line TBL may be minimized or reduced.

Meanwhile, in the transparent display panel 110 according to one embodiment of the present disclosure, in addition to the touch lines TL, a plurality of first signal lines SL1 and a second signal line SL2 may be disposed in the non-transmissive area NTA. At this time, the first signal lines SL1 and the second signal line SL2 may affect parasitic capacitance of the touch lines TL. The parasitic capacitance between the touch lines TL and the other signal lines SL1 and SL2 may affect a touch recognition rate. Hereinafter, a touch recognition rate based on a deviation of parasitic capacitance of the plurality of touch lines TL will be described with reference to FIGS. 8 to 10.

Figure 8:
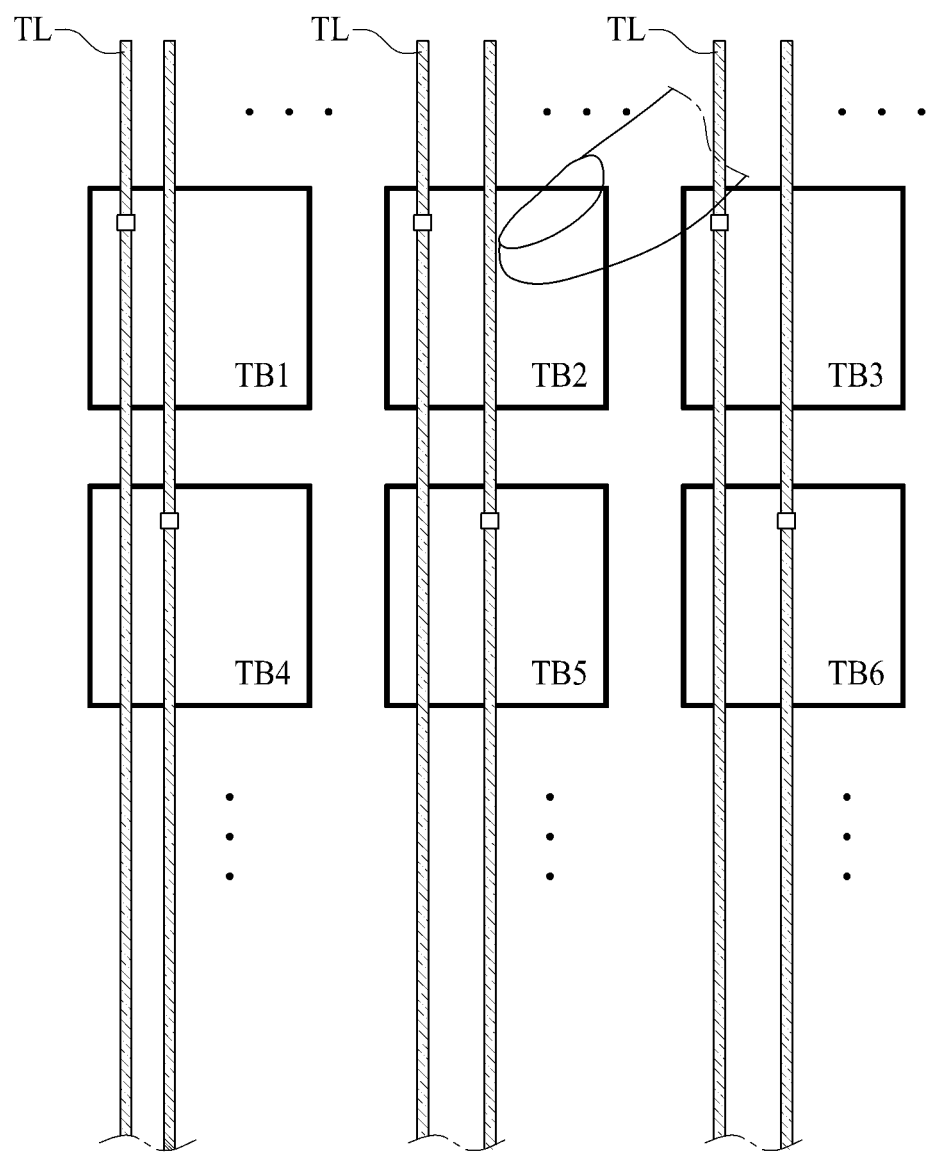
FIG. 8 is a view illustrating an example that a touch is recognized by one of a plurality of touch blocks.
Figure 9:
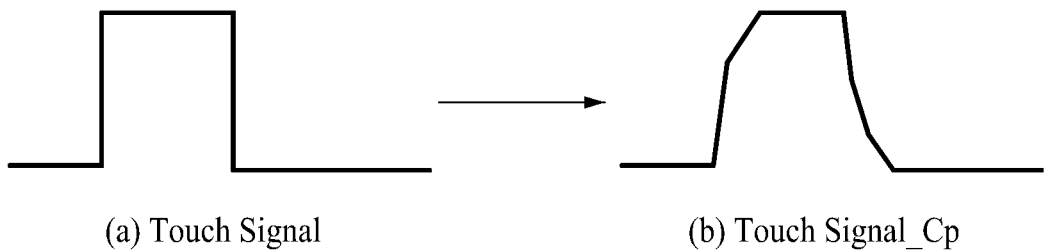
FIG. 9 is a view illustrating a touch signal in a case that parasitic does not exist and a case that a touch signal and parasitic capacitance exist.
Figure 10:
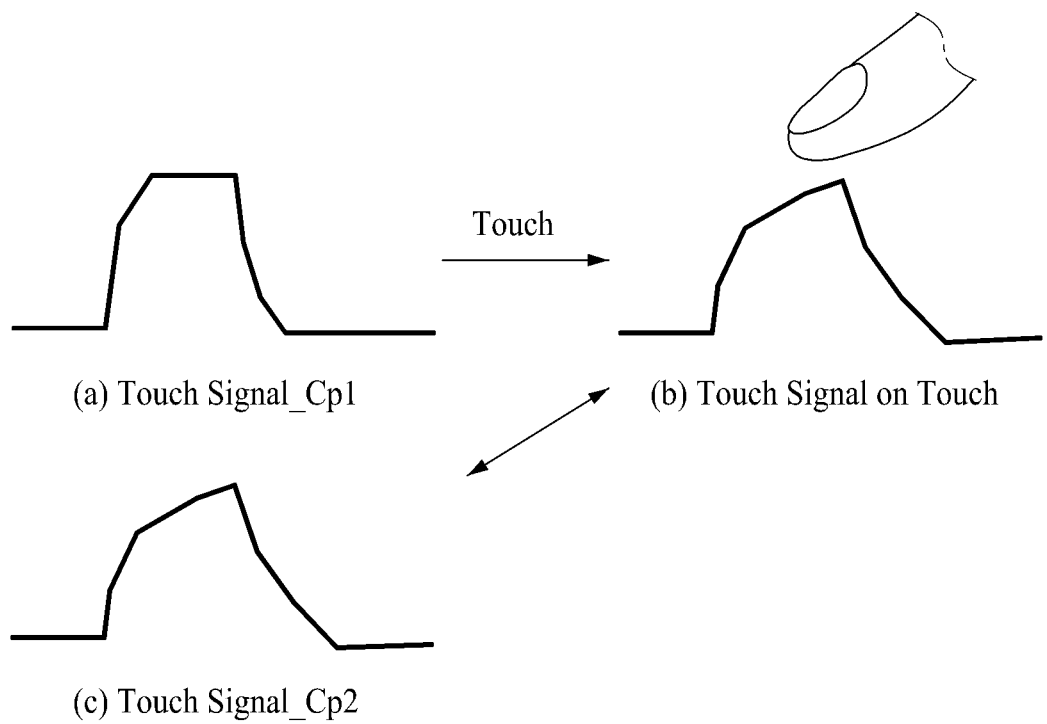
FIG. 10 is a view illustrating a touch recognition rate based on a deviation of parasitic capacitance.

FIG. 8 is a view illustrating an example that a touch is recognized by one of a plurality of touch blocks, FIG. 9 is a view illustrating a touch signal in a case that parasitic does not exist and a case that a touch signal and parasitic capacitance exist, and FIG. 10 is a view illustrating a touch recognition rate based on a deviation of parasitic capacitance.

As shown in FIG. 8, the transparent display panel 110 according to one embodiment of the present disclosure may include a plurality of touch blocks TB, which are basic units for determining a touch position of a user. Each of the plurality of touch blocks TB may include a plurality of touch sensors TS, and may be connected to one of the plurality of touch lines TL.

The touch line TL may provide a touch sensing signal to the touch sensors TS provided in the touch block TB. The touch sensing signal may be provided to the touch sensor TS through the touch line TL. At this time, when a touch sensing signal Touch signal_Cp input to the touch sensor TS passes through the touch line TL, as shown in FIG. 9, signal delay may occur due to parasitic capacitance of the touch line TL.

The parasitic capacitance may be different depending on the position in which the touch lines TL are disposed. Since each of the plurality of touch blocks TB is different from the connected touch line TL, the touch sensors TS respectively provided in the plurality of touch blocks TB may receive touch sensing signals of which signal delays are different from each other.

For example, the touch lines TL connected to each of first to third touch blocks TB1, TB2 and TB3 may have parasitic capacitance of a first value. The touch lines TL connected to each of fourth to sixth touch blocks TB4, TB5 and TB6 may have parasitic capacitance of a second value greater than the first value. In this case, a touch sensing signal such as Touch signal_Cp1 shown in FIG. 10 may be input to the touch sensors TS provided in each of the first to third touch blocks TB1, TB2 and TB3. A touch sensing signal such as Touch signal_Cp2 shown in FIG. 10 may be input to the touch sensors TS provided in each of the fourth to sixth touch blocks TB4, TB5 and TB6.

Meanwhile, the touch line TL may transfer capacitance of the touch sensors TS to a touch driver. The touch driver may sense a change in capacitance of the touch sensors TS, and may determine a touch position of a user. In detail, the touch driver may sense a change in capacitance of the touch sensors TS due to a signal difference between the touch block TB2, in which a touch occurs, and peripheral touch blocks TB1, TB3, TB4, TB5 and TB6.

The touch driver may recognize the touch by comparing a capacitance signal of the touch block TB2 with capacitance signals of the peripheral touch blocks TB4, TB5 and TB6. At this time, when there is a great difference in parasitic capacitance between the touch line TL connected to the touch block TB2, in which the touch occur, and the touch line TL connected to the peripheral touch blocks TB4, TB5 and TB6, the touch driver has difficulty detecting, or cannot detect, a change in the capacitance of the touch block TB2 in which the touch occurs, whereby the touch driver may not recognize the touch. That is, the touch recognition rate may be lowered.

For example, the touch sensing signal such as Touch signal_Cp1 shown in FIG. 10 may be input to the first to third touch blocks TB1, TB2 and TB3. When a user touch occurs in one of the first to third touch blocks TB1, TB2 and TB3, a current amount is reduced in the corresponding touch block TB2, whereby a capacitance signal such as Touch signal on Touch shown in FIG. 10 may be provided to the touch driver.

Meanwhile, signal delay may occur in the touch blocks TB4, TB5 and TB6 disposed near the touch block TB2, in which the touch occurs, due to great parasitic capacitance of the touch line TL, and the touch sensing signal such as Touch signal_Cp2 shown in FIG. 10 may be input to the touch blocks TB4, TB5 and TB6. When a user touch does not occur in the peripheral touch blocks TB4, TB5 and TB6, the peripheral touch blocks TB4, TB5 and TB6 may provide the capacitance signal, such as Touch signal_Cp2 shown in FIG. 10, to the touch driver.

Since the capacitance signal Touch signal on Touch of the touch block TB2 in which the touch occurs is similar to the capacitance signal Touch signal_Cp2 of the peripheral touch blocks TB4, TB5 and TB6, the touch driver has difficulty sensing, or cannot sense, a change in capacitance of the touch block TB2 in which the touch occurs.

As described above, when a deviation in parasitic capacitance of the touch lines TL is increased, the touch recognition rate may be lowered, and touch performance may be reduced. The transparent display panel 110 according to one embodiment of the present disclosure adjusts the parasitic capacitance of the touch lines TL, thereby improving uniformity of parasitic capacitance.

Figure 11:
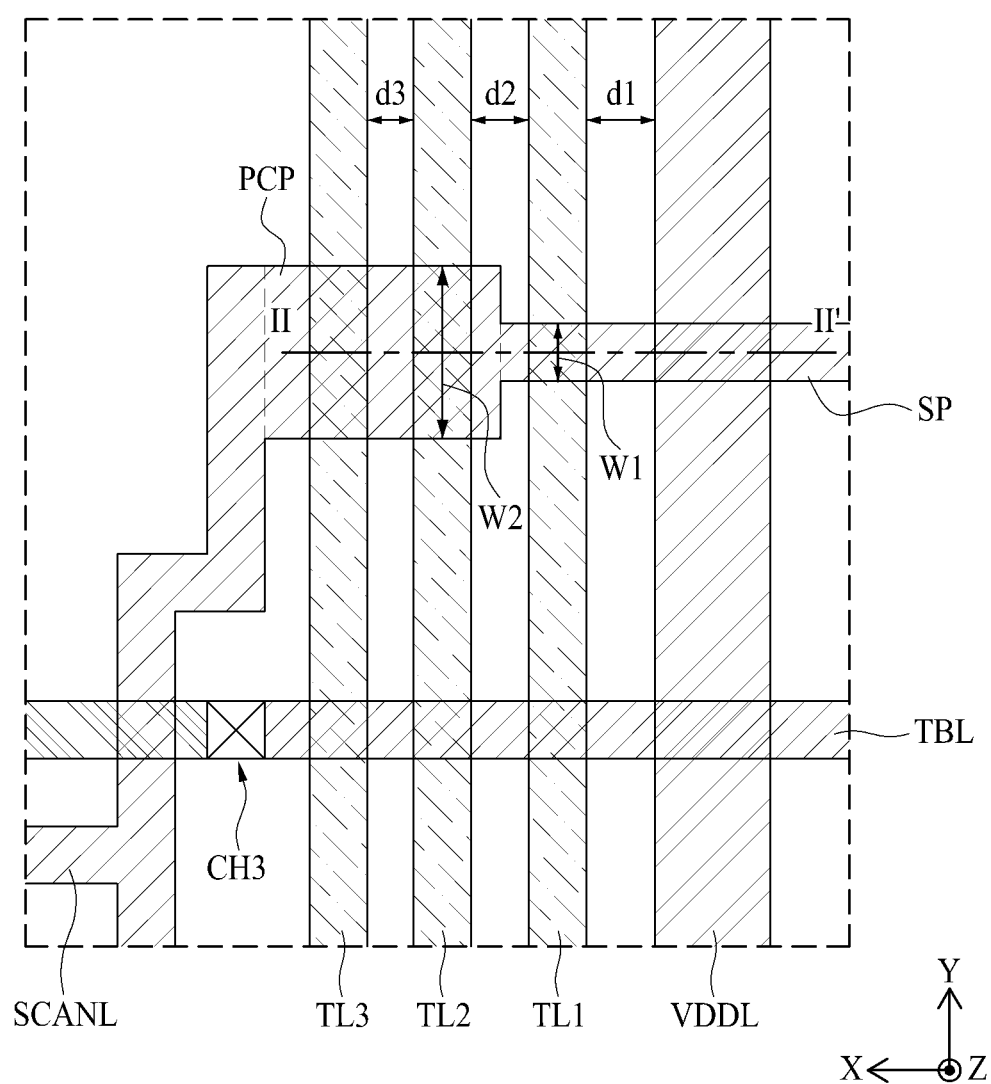
FIG. 11 is an enlarged view illustrating an example of an area C of FIG. 3.
Figure 12:
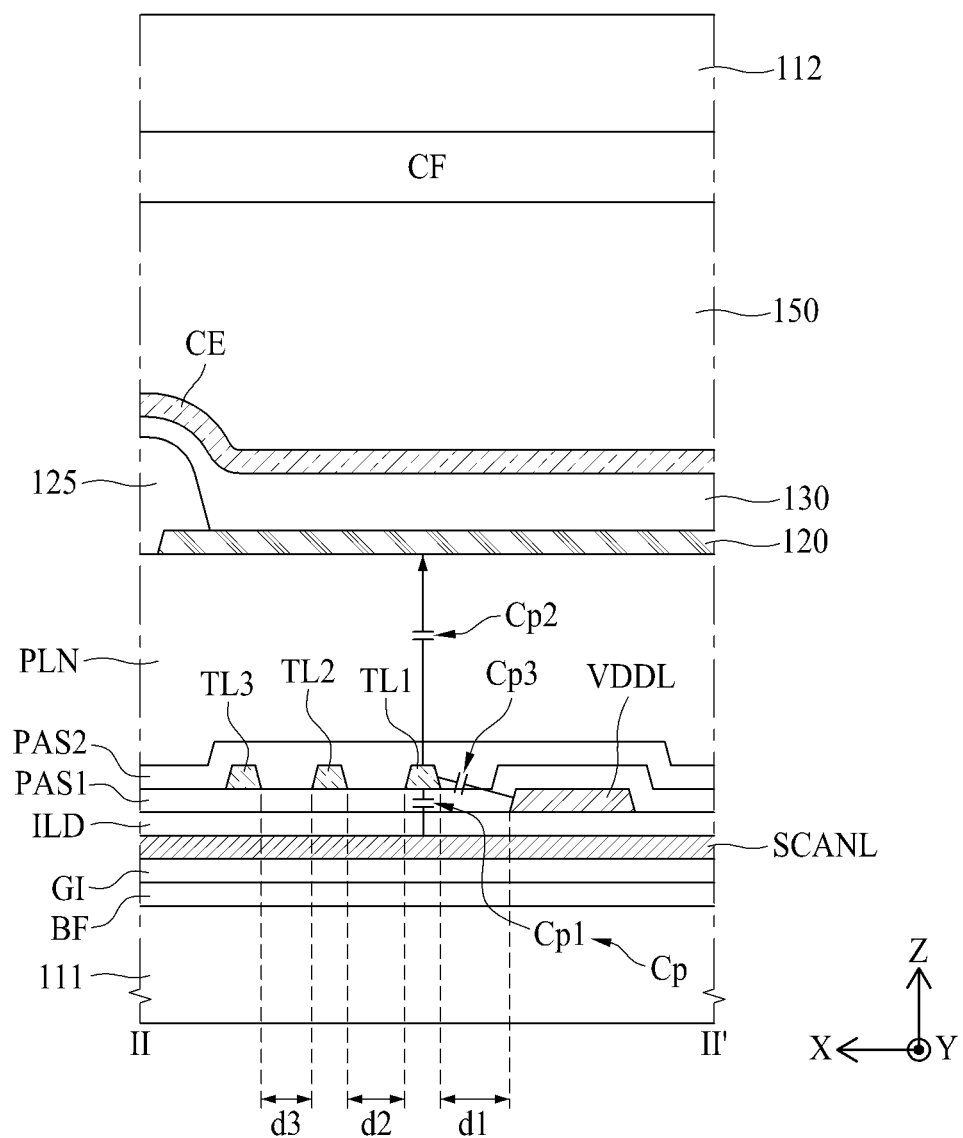
FIG. 12 is a cross-sectional view an example of line II-II' of FIG. 11.
Figure 13:
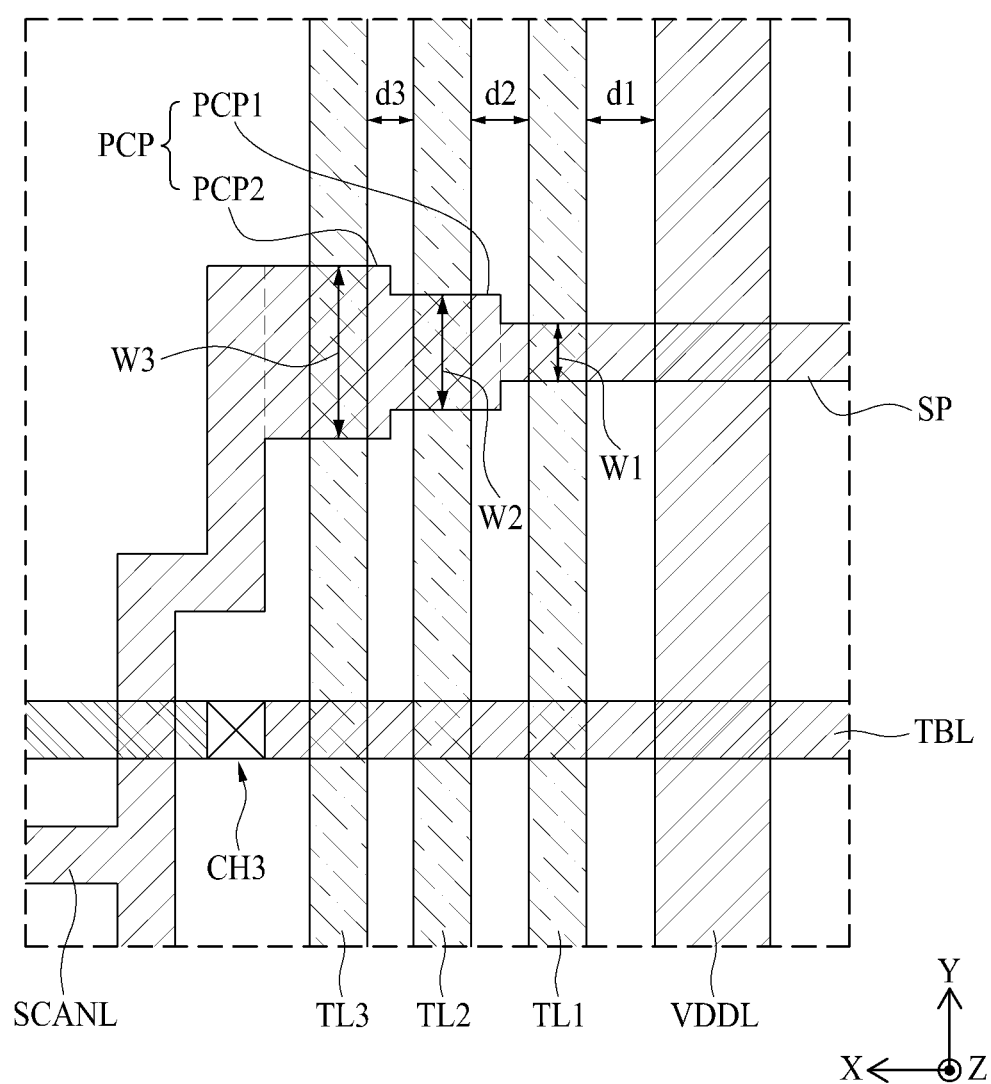
FIG. 13 is a view illustrating a modified embodiment of FIG. 11.
Figure 14:
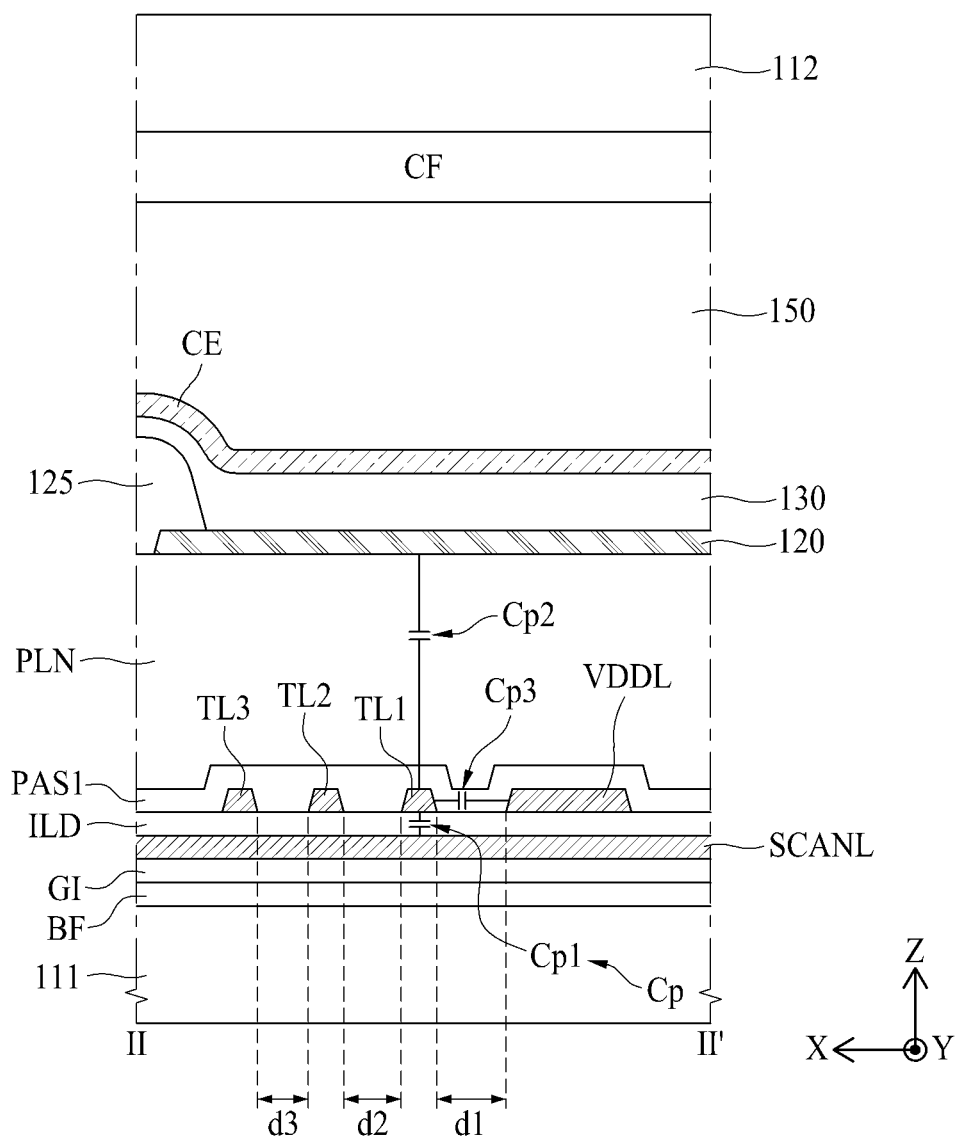
FIG. 14 is a cross-sectional view illustrating another example of line II-II' of FIG. 11.
Figure 15:
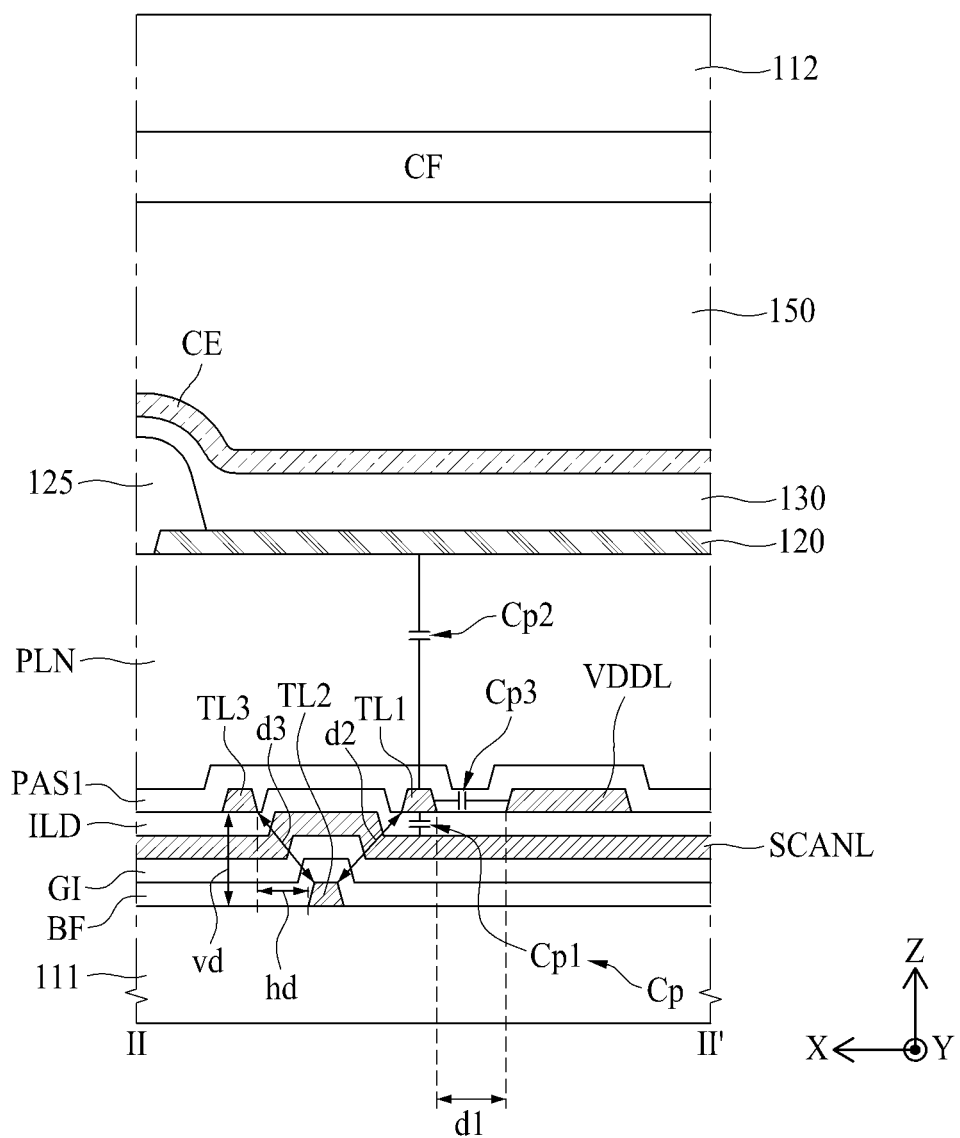
FIG. 15 is a cross-sectional view illustrating other example of line II-II' of FIG. 11.

FIG. 11 is an enlarged view illustrating an example of an area C of FIG. 3, FIG. 12 is a cross-sectional view an example of line II-II' of FIG. 11, FIG. 13 is a view illustrating a modified embodiment of FIG. 11, FIG. 14 is a cross-sectional view illustrating another example of line II-II' of FIG. 11, and FIG. 15 is a cross-sectional view illustrating other example of line II-II' of FIG. 11.

Referring to FIGS. 3 and 11 to 15, the plurality of touch lines TL may be disposed between the pixel power line VDDL and the transmissive area TA, or may be disposed between the common power line VSSL and the transmissive area TA. For example, a portion of the plurality of touch lines TL may be disposed between the pixel power line VDDL and the transmissive area TA, and the other portion of the plurality of touch lines TL may be disposed between the common power line VSSL and the transmissive area TA.

The plurality of touch lines TL may be disposed between the first passivation layer PAS1 and the second passivation layer PAS2. In the transparent display panel 110 according to one embodiment of the present disclosure, the plurality of touch lines TL may be provided between the first passivation layer PAS1 and the second passivation layer PAS2, thereby increasing a vertical distance from other signal lines.

In detail, a parasitic capacitance Cp may occur between the plurality of touch lines TL and the other signal lines. For example, the plurality of touch lines TL may generate a first parasitic capacitance Cp1 with a signal line, for example, the scan line SCANL, disposed therebelow to at least partially overlap the touch lines TL as shown in FIG. 12. In addition, the plurality of touch lines TL may generate a second parasitic capacitance Cp2 with a signal line, for example, the first electrode 120, disposed thereabove to at least partially overlap the touch lines TL. Also, the plurality of touch lines TL may generate a third parasitic capacitance Cp3 with a signal line, for example, the pixel power line VDDL or the common power line VSSL, disposed to be adjacent to the touch lines TL in a horizontal direction although not overlapped with the touch lines TL.

The plurality of touch lines TL may be disposed between the first passivation layer PAS1 and the second passivation layer PAS2, so that a vertical distance from the scan line SCANL may be increased as compared with the case that the touch lines are disposed below the first passivation layer PAS1. Therefore, the first parasitic capacitance Cp1 of the plurality of touch lines TL may be reduced.

In addition, when the plurality of touch lines TL are provided in the same layer as the pixel power line VDDL or the common power line VSSL, the vertical distance from the pixel power line VDDL or the common power line VSSL may be increased. As a result, the spaced distance between the pixel power line VDDL and the common power line VSSL is increased, whereby the third parasitic capacitance Cp3 of the plurality of touch lines TL may be reduced.

Meanwhile, the first to third parasitic capacitances Cp1 to Cp3 may be different depending on the position in which the plurality of touch lines TL are disposed, and as a result, the parasitic capacitance Cp may be different. In more detail, at least two touch lines TL1, TL2 and TL3 may be disposed between the pixel power line VDDL and the transmissive area TA. For example, the first to third touch lines TL1, TL2 and TL3 may be disposed between the pixel power line VDDL and the transmissive area TA, but are not limited thereto. Two touch lines or four or more touch lines may be disposed between the pixel power line VDDL and the transmissive area TA.

Also, at least two touch lines TL4, TL5 and TL6 may be disposed between the common power line VSSL and the transmissive area TA. For example, the fourth to sixth touch lines TL4, TL5 and TL6 may be disposed between the common power line VSSL and the transmissive area TA, but are not limited thereto. Two touch lines or four or more touch lines may be disposed between the common power line VSSL and the transmissive area TA.

Hereinafter, for convenience of description, it is assumed that the first to third touch lines TL1, TL2 and TL3 are disposed between the pixel power line VDDL and the transmissive area TA. In addition, although the first to third touch lines TL1, TL2 and TL3 disposed between the pixel power line VDDL and the transmissive area TA will be mainly described, the description of the first to third touch lines TL1, TL2 and TL3 may be also applied to the fourth to sixth touch lines TL4, TL5 and TL6. In this case, the description of the first touch line TL1 may be applied to the fourth touch line TL4, the description of the second touch line TL2 may be applied to the fifth touch line TL5, and the description of the third touch line TL3 may be applied to the sixth touch line TL6. In this case, the common power line VSSL may be applied instead of the pixel power line VDDL.

The first to third touch lines TL1, TL2 and TL3 may be different from one another in the third parasitic capacitance Cp3. The first touch line TL1 may be disposed between the pixel power line VDDL and the transmissive area TA, the second touch line TL2 may be disposed between the first touch line TL1 and the transmissive area TA, and the third touch line TL3 may be disposed between the second touch line TL2 and the transmissive area TA. That is, the first touch line TL1 may be disposed to be closest to the pixel power line VDDL, and the third touch line TL3 may be farthest from the pixel power line VDDL. Therefore, the first touch line TL1 may generate the third parasitic capacitance Cp3 larger than that of each of the second touch line TL2 and the third touch line TL3. On the other hand, the third touch line TL3 may generate the third parasitic capacitance Cp3 smaller than that of each of the first touch line TL1 and the second touch line TL2.

In addition, the first to third touch lines TL1, TL2 and TL3 may be different from one another in the second parasitic capacitance Cp2. The first touch line TL1 may be disposed to be farthest from the transmissive area TA, and may be disposed to be closest to a middle area of the first electrode 120. Since the parasitic capacitance Cp may also include a horizontal component as well as a vertical component, the first electrode 120 may have a wide area with the first touch line TL1, in which the second parasitic capacitance Cp2 is formed. On the other hand, the third touch line TL3 may be disposed to be closest to the transmissive area TA, and may be disposed to be closest to the end of the first electrode 120. Therefore, the first electrode 120 may have a small area with the third touch line TL3, in which the second parasitic capacitance CP2 is formed. That is, the first touch line TL1 may have a second parasitic capacitance Cp2 larger than that of each of the second touch line TL2 and the third touch line TL3. On the other hand, the third touch line TL3 may generate the second parasitic capacitance Cp2 smaller than that of each of the first touch line TL1 and the second touch line TL2.

As a result, the first touch line TL1 has the largest parasitic capacitance Cp, and the third touch line TL3 may have the smallest parasitic capacitance Cp. Since signal lines are disposed in a space narrower than a general display panel, the spaced distance between the signal lines and the touch lines TL may be reduced, and an overlap area therebetween may be increased. As a result, the parasitic capacitance Cp of the touch lines TL may be increased, and its deviation may be increased.

In order to satisfy touch performance in the transparent display panel 110, it is preferable that the deviation of the parasitic capacitance Cp is less than 7 pF. However, when the first to third touch lines TL1, TL2 and TL3 are disposed at the same distance between the pixel power line VDDL and the transmissive area TA, the first to third touch lines TL1, TL2 and TL3 may generate a deviation of the parasitic capacitance Cp close to 20 pF.

In the transparent display panel 110 according to one embodiment of the present disclosure, a spaced distance among the first to third touch lines TL1, TL2 and TL3 may be adjusted to reduce the deviation of the parasitic capacitance Cp. In detail, the first touch line TL1 may be disposed to have first spaced distance d1 with the pixel power line VDDL, the second touch line TL2 may be disposed to have a second spaced distance d2 with the first touch line TL1, and the third touch line TL3 may be disposed to have a third spaced distance d3 with the second touch line TL2. At this time, the first spaced distance d1 may be greater than the second spaced distance d2. The third spaced distance d3 may be smaller than the second spaced distance d2 and the first spaced distance d1.

In the transparent display panel 110 according to one embodiment of the present disclosure, the first spaced distance d1 may be increased to reduce the second parasitic capacitance Cp2 and the third parasitic capacitance Cp3 of the first touch line TL1. Also, in the transparent display panel 110 according to one embodiment of the present disclosure, the first spaced distance d1 may be increased and the second spaced distance d2 and the third spaced distance d3 may be reduced, so that the distance between the pixel power line VDDL and the transmissive area TA may not be increased. Therefore, the transparent display panel 110 according to one embodiment of the present disclosure may reduce the parasitic capacitance Cp of the first touch line TL1 without reducing transmittance.

Furthermore, the transparent display panel 110 according to one embodiment of the present disclosure may reduce the deviation of the parasitic capacitance Cp in the first to third touch lines TL1, TL2 and TL3. The first touch line TL1 may increase the first spaced distance d1 with the pixel power line VDDL, thereby reducing the parasitic capacitance Cp. However, since the distance between the third touch line TL3 and the pixel power line VDDL is maintained, there may be no change in the parasitic capacitance Cp. As a result, the deviation of the parasitic capacitance Cp in the first to third touch lines TL1, TL2 and TL3 may be reduced, and a touch recognition rate of the transparent display panel 110 may be increased.

The transparent display panel 110 according to one embodiment of the present disclosure may reduce the deviation of the parasitic capacitance Cp by controlling a size of an area where the first to third touch lines TL1, TL2 and TL3 overlap the scan line. In detail, the first to third touch lines TL1, TL2 and TL3 may have different sizes of areas that overlap the scan line SCANL. The first touch line TL1 may have a first area to overlap at least part of the scan line SCANL, the second touch line TL2 may have a second area to overlap at least part of the scan line SCANL, and the third touch line TL3 may have a third area to overlap at least part of the scan line SCANL. At this time, the second area and the third area may be smaller than the first area.

The second area of the second touch line TL2 and the third area of the third touch line TL3, which overlap at least part of the scan line SCANL, may be increased, so that the first parasitic capacitance Cp1 may be increased. On the other hand, the first area of the first touch line TL1, which overlaps at least part of the scan line SCANL, may be maintained so that there may be no change in the first parasitic capacitance Cp1. As a result, the deviation of the parasitic capacitance Cp in the first to third touch lines TL1, TL2 and TL3 may be reduced, and the touch recognition rate of the transparent display panel 110 may be increased.

In one embodiment, as shown in FIG. 11, the scan line SCANL may include a signal pattern SP having a signal pattern SP having a first width W1 and a parasitic cap compensation pattern PCP having a second width W2. The second width W2 may be greater than the first width W1. The signal pattern SP may overlap at least part of the first touch line TL1, and the parasitic cap compensation pattern PCP may overlap at least part of the second touch line TL2 and the third touch line TL3. Therefore, the areas of the second touch line TL2 and the third touch line TL3, which overlap at least part of the scan line SCANL, may be larger than the first touch line TL1.

In FIG. 11, the second touch line TL2 and the third touch line TL3 have the same size of area that overlap at least part of the scan line SCANL, but are not limited thereto. The second area of the second touch line TL2 and the third area of the third touch line TL3, which overlap at least part of the scan line SCANL, may be different from each other as shown in FIG. 13.

In detail, the scan line SCANL may include a signal pattern SP having a first width W1, a first parasitic cap compensation pattern PCP1 having a second width W2 and a second parasitic cap compensation pattern PCP2 having a third width W3, as shown in FIG. 13. The third width W3 may be greater than the second width W2, and the second width W2 may be greater than the first width W1. The signal pattern SP may overlap at least part of the first touch line TL1, and the first parasitic cap compensation pattern PCP1 may overlap at least part of the second touch line TL2. The second parasitic cap compensation pattern PCP2 may overlap at least part of the third touch line TL3. The area of the third touch line TL3, which overlaps at least part of the scan line SCANL, may be larger than the second touch line TL2 and the first touch line TL1. The second touch line TL2 may be larger than the first touch line TL1. Therefore, the third touch line TL3 may increase the first parasitic capacitance Cp1 to be greater than the second touch line TL2. The third touch line TL3 may have a second parasitic capacitance Cp2 and a third parasitic capacitance Cp3 smaller than the second touch line TL2 and the first touch line TL1. The area of the second touch line TL2, which overlaps at least part of the scan line SCANL, may be greater than the first touch line TL1. Therefore, the first parasitic capacitance Cp1 of the third touch line TL3 may be more greatly increased than that of the second touch line TL2. The third touch line TL3 may be smaller than the second touch line TL2 and the first touch line TL1 in the second parasitic capacitance Cp2 and third parasitic capacitance Cp3. The first parasitic capacitance of the third touch line TL3 may be more greatly increased than that of the second touch line TL2 by the second parasitic cap compensation pattern PCP2, whereby the variation of the parasitic capacitance Cp with the second touch line TL2 and the first touch line TL1 may be reduced.

In the transparent display panel 110 according to one embodiment of the present disclosure, the spaced distance among the first to third touch lines TL1, TL2 and TL3 may be adjusted, and a sizes of an areas where the first to third touch lines TL1, TL2 and TL3 overlap at least part of the scan line SCANL may be adjusted, whereby the deviation of the parasitic capacitance Cp may be greatly reduced. The first touch line TL1 may be greater than the second and third touch lines TL2 and TL3 in the second parasitic capacitance Cp2 and the third parasitic capacitance Cp3. In the transparent display panel 110 according to one embodiment of the present disclosure, the first spaced distance d1 between the first touch line TL1 and the pixel power line VDDL may be increased so that the second parasitic capacitance Cp2 and the third parasitic capacitance Cp3 of the first touch line TL1 by increased. As a result, the parasitic capacitance Cp of the first touch line TL1 may be reduced.

Meanwhile, in the transparent display panel 110 according to one embodiment of the present disclosure, the size of area where the second touch line TL2 and the scan line SCANL overlap may be increased, whereby the first parasitic capacitance Cp1 of the second touch line TL2 may be increased. Also, in the transparent display panel 110 according to one embodiment of the present disclosure, the size of area where the third touch line TL3 overlaps the scan line SCANL may be increased, whereby the first parasitic capacitance Cp1 of the third touch line TL3 may be increased.

Even though the spaced distance among the first to third touch lines TL1, TL2 and TL3 is adjusted, the first touch line TL1 may have a second parasitic capacitance Cp2 and a third parasitic capacitance Cp3, which are greater than those of the second and third touch lines TL2 and TL3. In the transparent display panel 110 according to one embodiment of the present disclosure, the first parasitic capacitance Cp1 of the second and third touch lines TL2 and TL3 may be increased, whereby the deviation of the parasitic capacitance Cp in the first to third touch lines TL1, TL2 and TL3 may be reduced to 7 pF or less.

In FIG. 12, a plurality of touch lines TL are provided between the first passivation layer PAS1 and the second passivation layer PAS2, but are not limited thereto.

In another embodiment, the plurality of touch lines TL may be provided between the first substrate 111 and the passivation layer PAS1. The plurality of touch lines TL may be provided in the same layer as at least one of the other signal lines. For example, the touch lines TL may be disposed in the same layer as the source electrode SE and the drain electrode DE of the driving transistor DTR as shown in FIG. 14.

The transparent display panel 110 provided with the touch lines TL shown in FIG. 14 a separate mask is not required to form the touch line TL, and additional process such as a process of forming the second passivation layer PAS2 may not be required. As a result, in the transparent display panel 110 provided with the touch lines TL shown in FIG. 14, the mask cost may be reduced and the process may be simplified as compared with the transparent display panel 110 provided with the touch lines TL shown in FIG. 12.

Meanwhile, FIG. 12 and FIG. 14 show that the plurality of touch lines TL are provided in the same layer, but are not limited thereto.

In another embodiment, the plurality of touch lines TL may be provided in different layers. A portion of the plurality of touch lines TL may be provided in a first layer, and the other portion thereof may be provided in a second layer. For example, as shown in FIG. 15, a portion of the plurality of touch lines TL may be disposed in the same layer as the source electrode SE and the drain electrode DE of the driving transistor DTR, and the other portion thereof may be disposed in the same layer as the light shielding layer LS. The first and third touch lines TL1 and TL3 may be disposed in the same layer as the source electrode SE and the drain electrode DE of the driving transistor DTR, and the second touch line TL2 may be disposed in the same layer as the light shielding layer LS, but the present disclosure is not limited thereto. The first and third touch lines TL1 and TL3 may be disposed in the same layer as the light shielding layer LS of the driving transistor DTR, and the second touch line TL2 may be disposed in the same layer as the source electrode SE and the drain electrode DE.

At this time, the touch line TL disposed in the first layer and the touch line TL disposed in the second layer may be alternately disposed to increase the vertical distance vd between the touch lines TL. The transparent display panel 110 provided with the touch lines TL shown in FIG. 15 may reduce the horizontal distance hd between the touch lines TL as the vertical distance vd is increased. Therefore, the transparent display panel 110 provided with the touch lines TL shown in FIG. 15 may reduce the width of the first non-transmissive area NTA1 as compared with the transparent display panel 110 provided with the touch lines TL shown in FIGS. 12 and 14, and the area of the transmissive area TA is increased, whereby light transmittance may be improved.

According to the present disclosure, the following advantageous effects may be obtained.

In the present disclosure, the touch sensor electrode of the touch sensor and the cathode electrode of the light emitting element may be formed at the same time using the undercut structure, so that the touch process may be simplified, and a separate mask for the touch sensor electrode is not additionally required.

Also, in the present disclosure, as the spaced distance between the touch lines and between the touch line and the other signal line may be adjusted to reduce the deviation of parasitic capacitance between the touch lines.

Also, in the present disclosure, the overlapping area between the touch lines and the signal line may be adjusted to reduce or minimize the deviation of parasitic capacitance between the touch lines, whereby uniformity of parasitic capacitance may be more improved.

Also, in the present disclosure, the touch line may be disposed to overlap the pixel, whereby light transmittance may be prevented from being deteriorated due to the touch line.

Also, in the present disclosure, the touch line may be disposed so as not to overlap the circuit area, whereby an influence of the circuit element on the touch line may be reduced or minimized.

It will be apparent to those skilled in the art that the present disclosure described above is not limited by the above-described embodiments and the accompanying drawings and that various substitutions, modifications and variations can be made in the present disclosure without departing from the spirit or scope of the disclosures. Consequently, it is intended that all variations or modifications derived from the meaning, scope and equivalent concept of the claims fall within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety.

Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transparent display device, comprising:
   a substrate provided with a transmissive area and a non-transmissive area;
   a plurality of touch lines extending in a first direction in the non-transmissive area, the plurality of touch lines including a first touch line and a second touch line;
   a pixel provided in the non-transmissive area over the substrate, the pixel including a plurality of light emitting elements, each of the plurality of light emitting elements including an anode electrode, a light emitting layer and a cathode electrode;
   a first signal line extended from the non-transmissive area in the first direction;
   wherein the first signal line includes a pixel power line supplying a first power source to the anode electrode of each of the plurality of light emitting elements or a common power line supplying a second power source to the cathode electrode of the plurality of light emitting elements,
   a second signal line provided in the non-transmissive area; and
   a touch bridge line connected to a touch line of the plurality of touch lines,
   wherein the second signal line and the touch bridge line extend in a second direction,
   wherein the cathode electrode has an opening area formed along at least one edge of the non-transmissive area and transmissive area,
   wherein the cathode electrode is divided by the opening area, and
   wherein the cathode electrode overlaps the plurality of touch lines and the touch bridge line.

2. The transparent display device of claim 1, further comprising;
   a plurality of driving transistors provided in the non-transmissive area and respectively connected to the plurality of light emitting elements; and
   wherein the first touch line is disposed between the first signal line and the transmissive area; and
   wherein the second touch line is disposed between the first touch line and the transmissive area,
   wherein the first touch line and the second touch line do not overlap with the plurality of driving transistors.

3. The transparent display device of claim 2, wherein the first and second touch lines are disposed in a layer provided between the plurality of driving transistors and the anode electrode.

4. The transparent display device of claim 2, wherein the first and second touch lines are disposed in the same layer as source and drain electrodes of the driving transistors.

5. The transparent display device of claim 1, further comprising;
   a first touch line between the first signal line and the transmissive area;
   a second touch line between the first touch line and the transmissive area; and
   a third touch line provided between the transmissive area and the second touch line,
   wherein the first touch line is disposed to have a first spaced distance from the first signal line, the second touch line is disposed to have a second spaced distance from the first touch line,
   the third touch line is disposed to have a third spaced distance from the second touch line,
   wherein the first spaced distance is greater than the second spaced distance and the third spaced distance is smaller than the second spaced distance.

6. The transparent display device of claim 5, wherein the first touch line and the third touch line are disposed in a layer different from the second touch line.

7. The transparent display device of claim 6, wherein the first and third touch lines are disposed in the same layer as a source electrode and a drain electrode of a driving transistor, and the second touch line is disposed in the same layer as a light shielding layer provided between the substrate and the driving transistor.

8. The transparent display device of claim 1,
wherein the first touch line is disposed between the first signal line and the transmissive area; and
wherein the second touch line is disposed between the first touch line and the transmissive area,
wherein the second signal line at least partially overlaps the first touch line and the second touch line,
wherein a second area in which the second touch line and the second signal line overlap each other is larger than a first area in which the first touch line and the second signal line overlap each other.

9. The transparent display device of claim 8, wherein the second signal line includes a signal pattern that overlaps at least part of the first touch line and has a first width, and a parasitic cap compensation pattern that overlaps at least part of the second touch line and has a second width greater than the first width.

10. The transparent display device of claim 8, wherein the second signal line is a scan line supplying a scan signal to each of the plurality of light emitting elements.

11. The transparent display device of claim 1, further comprising:
a touch sensor over the substrate, the touch sensor including a touch sensor electrode, wherein the cathode electrode and the touch sensor electrode are provided in the same layer.

12. The transparent display device of claim 11, further comprising a first undercut structure provided in the transmissive area, the first undercut structure having a planar closed shape,
wherein the cathode electrode and the touch sensor electrode are separated from each other by the first undercut structure.

13. The transparent display device of claim 11, wherein a plurality of touch sensors is provided and a plurality of pixels is provided, and
wherein the plurality of touch sensors are disposed to correspond to the plurality of pixels one-to-one.

14. A transparent display device, comprising:
a substrate provided with a transmissive area and a non-transmissive area;
a touch sensor provided in the transmissive area over the substrate, the touch sensor including a touch sensor electrode;
a pixel provided in the non-transmissive area over the substrate, the pixel including a plurality of light emitting elements, each of the plurality of light emitting elements including an anode electrode, a light emitting layer and a cathode electrode;
a plurality of driving transistors provided in the non-transmissive area and respectively connected to the plurality of light emitting elements;
a first signal line extended from the non-transmissive area in a first direction;
a first touch line provded between the first signal line and the transmissive area; and
a second touch line provided between the first touch line and the transmissive area,
wherein the first touch line is disposed to have a first spaced distance from the first signal line, the second touch line is disposed to have a second spaced distance from the first touch line, and the first spaced distance is greater than the second spaced distance,
wherein the first touch line and the second touch line do not overlap with the plurality of driving transistors, and
wherein the first and second touch lines are disposed in a layer provided between the plurality of driving transistors and the anode electrode.

* * * * *